(12) United States Patent
Andersson et al.

(10) Patent No.: US 10,841,597 B2
(45) Date of Patent: Nov. 17, 2020

(54) ENCODING A PIXEL OF AN INPUT VIDEO SEQUENCE

(71) Applicant: TELEFONAKTIEBOLAGET LM ERICSSON (PUBL), Stockholm (SE)

(72) Inventors: Kenneth Andersson, Gävle (SE); Jacob Ström, Stockholm (SE); Per Wennersten, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/579,325

(22) PCT Filed: May 30, 2016

(86) PCT No.: PCT/SE2016/050498
§ 371 (c)(1),
(2) Date: Dec. 4, 2017

(87) PCT Pub. No.: WO2016/195576
PCT Pub. Date: Dec. 8, 2016

(65) Prior Publication Data
US 2018/0160126 A1 Jun. 7, 2018

Related U.S. Application Data

(60) Provisional application No. 62/171,594, filed on Jun. 5, 2015.

(51) Int. Cl.
*H04N 19/182* (2014.01)
*H04N 19/186* (2014.01)
(Continued)

(52) U.S. Cl.
CPC ......... *H04N 19/182* (2014.11); *H04N 19/117* (2014.11); *H04N 19/124* (2014.11);
(Continued)

(58) Field of Classification Search
CPC .. H04N 19/182; H04N 19/117; H04N 19/124; H04N 19/132; H04N 19/147;
(Continued)

(56) References Cited

U.S. PATENT DOCUMENTS 7,149,348 B1 * 12/2006 Borg .................... H04N 1/6033
382/162
2003/0002734 A1 * 1/2003 Islam .................... H04N 19/63
382/166
(Continued)

FOREIGN PATENT DOCUMENTS

CN 101807384 A 8/2010
CN 103581634 A 2/2014
(Continued)

OTHER PUBLICATIONS

Google Scholar Search Results.*
(Continued)

*Primary Examiner* — Qun Shen
(74) *Attorney, Agent, or Firm* — Rothwell, Figg, Ernst & Manbeck, P.C.

(57) ABSTRACT

A method of encoding a pixel comprises encoding second and third color component values of the pixel in a first color space. A first color component value in a second color space is obtained for the pixel. A first color component value in the first color space is determined based on minimizing an error computed based on a difference between the first color component value in the second color space and a test color component value in the second color space derived based on the encoded second and third color component values. The first color component value in the first color space is then encoded. The target value for coding of the first color
(Continued)

component is thereby adapted given encoding of the second and third color components. As a result the visual quality of the pixel is improved.

22 Claims, 12 Drawing Sheets

(51) Int. Cl.
| | |
|---|---|
| H04N 19/154 | (2014.01) |
| H04N 19/117 | (2014.01) |
| H04N 19/86 | (2014.01) |
| H04N 19/124 | (2014.01) |
| H04N 19/132 | (2014.01) |
| H04N 19/147 | (2014.01) |
| H04N 19/159 | (2014.01) |
| H04N 19/177 | (2014.01) |
| H04N 19/44 | (2014.01) |
| H04N 19/65 | (2014.01) |

(52) U.S. Cl.
CPC ......... *H04N 19/132* (2014.11); *H04N 19/147* (2014.11); *H04N 19/154* (2014.11); *H04N 19/159* (2014.11); *H04N 19/177* (2014.11); *H04N 19/186* (2014.11); *H04N 19/44* (2014.11); *H04N 19/65* (2014.11); *H04N 19/86* (2014.11)

(58) Field of Classification Search
CPC .. H04N 19/154; H04N 19/159; H04N 19/177; H04N 19/186; H04N 19/44; H04N 19/65; H04N 19/86
See application file for complete search history.

(56) References Cited

U.S. PATENT DOCUMENTS

| | | | |
|---|---|---|---|
| 2005/0213128 A1* | 9/2005 | Imai | H04N 1/6077 358/1.9 |
| 2006/0071938 A1* | 4/2006 | Richardson | G09G 5/02 345/591 |
| 2008/0226165 A1* | 9/2008 | Wada | G06T 5/009 382/167 |
| 2009/0060324 A1* | 3/2009 | Ballerini | H04N 19/86 382/166 |
| 2011/0158521 A1* | 6/2011 | Park | H04N 1/644 382/166 |
| 2013/0222411 A1* | 8/2013 | Tripathi | H04N 9/68 345/590 |
| 2014/0185676 A1 | 7/2014 | Chen et al. | |
| 2015/0098650 A1* | 4/2015 | Atkins | G06T 5/007 382/167 |
| 2016/0261860 A1* | 9/2016 | Gu | G09G 3/006 |
| 2016/0261865 A1* | 9/2016 | Li | H04N 9/64 |
| 2016/0330468 A1* | 11/2016 | Minezawa | H04N 19/503 |
| 2017/0318301 A1* | 11/2017 | Li | H04N 19/176 |

FOREIGN PATENT DOCUMENTS

| | | |
|---|---|---|
| CN | 103856780 A | 6/2014 |
| EP | 2200268 A1 | 6/2010 |
| GB | 2516225 A | 1/2015 |
| JP | 2010147756 A | 7/2010 |
| JP | 2013211662 A | 10/2013 |
| RU | 2204217 C2 | 5/2003 |
| RU | 2533852 C2 | 11/2014 |
| WO | 2007078563 A2 | 7/2007 |
| WO | 2014092867 A1 | 6/2014 |

OTHER PUBLICATIONS

International Search Report and Written Opinion issued in Application No. PCT/SE2016/050498 dated Oct. 13, 2016, 14 pages.
Topiwala, P., et al., "Color Spaces and Chroma Sampling for HDR Video Coding", 110. MPEG meeting; Oct. 2014; Strasbourg, France (Motion Picture Expert Group or ISO/IEC JTC1/SC29/WG11), nr. m35305; 2 pages.
Tourapis, A.M., et al., "Report on the XYZ/HDR Exploratory Experiment 6 (EE6): Color Space Conversion for XYZ/HDR Video Delivery", 109. MPEG meeting; Jul. 2014; Sapporo, Japan; (Motion Picture Expert Group or ISO/IEC JTC1/SC29/WG11), nr. m34169; 8 pages.
Ström, J., et al., "Fast Calculation of mPSNR HDR Video Error", International Organisation for Standardisation , ISO/IEC JTC1/SC29/WG11, Coding of Moving Pictures and Audio, mpeg2014/m35060; Oct. 2014, Strasbourg, France; 7 pages.
Sole, J., et al., "HDR CE5 test 3: Constant Luminance results", 23. JCT-VC meeting; Feb. 2016, San Diego, US; (Joint collaborative team on vide coding opf ISO/IEC JTC1/SC29/WG11 and ITU-T SG. 16); 5 pages.
Francois:"High Dynamic Range and Wide Color Gamut Video Coding in HEVC: Status and Potential Future Enhancements", IEEE Transactions on Circuits and Systems for Video Technology, vol. 26, No. 1, Jan. 2016; 13 pages.
Samuelsson, J., et al., "Using chroma QP offset on HDR sequences", International Organisation for Standardisation , ISO/IEC JTC1/SC29/WG11, Coding of Moving Pictures and Audio, mpeg2014/m36581; Jun. 2015, Warsaw, Poland; 5 pages.
Kunkel, T., et al., "HDR and Wide Gamut Appearance-based Color Encoding and its Quantification", IEEE 2013; 4 pages.
Liu, J., et al., "Chromatic Calibration of an HDR Display using 3D OCTREE Forests", IEEE 2015; 5 pages.
Francois, E., et al., "About using a BT.2020 container for BT.709 content", 110. MPEG meeting; Oct. 2014; Strasbourg, France, m35255; 14 pages.
Luthra, A., et al., "Test sequences and anchor generation for HDR and Wide Gamut Content Distribution", 109. MPEG meeting; Jul. 2014; Sapporo, Japan; (Motion Picture Expert Group or ISO/IEC JTC1/SC29/WG11), N145548; 14 pages.
Luthra, A., et al., "Call for Evidence (CfE) for HDR and WCG Video Coding", MPEG meeting; Feb. 2015; Geneva, Switzerland; (Motion Picture Expert Group or ISO/IEC JTC1/SC29/WG11), N15083; 46 pages.
International Telecommunication Union; ITU-T; H.265, "Series H: Audiovisual and Multimedia Systems: Infrastracture of audiovisual services—Coding of moving video", High efficiency video coding; Apr. 2015, 634 pages.
Ström, J., et al., "Ericsson's response to CfE for HDR and WCG", International Organisation for Standardisation , ISO/IEC JTC1/SC29/WG11, Coding of Moving Pictures and Audio, mpeg2014/m36184; Feb. 2015, Geneva, Switzerland; 11 pages.
Russian Search Report issued in Application No. 2017145585 dated Oct. 9, 2018, 2 pages.
The extended European Search Report issued in Application No. 16803854.5 dated Feb. 11, 2019, 8 pages.
Search Report issued in Chinese Application No. 2016800458549, dated Oct. 21, 2019 (3 pages).

* cited by examiner

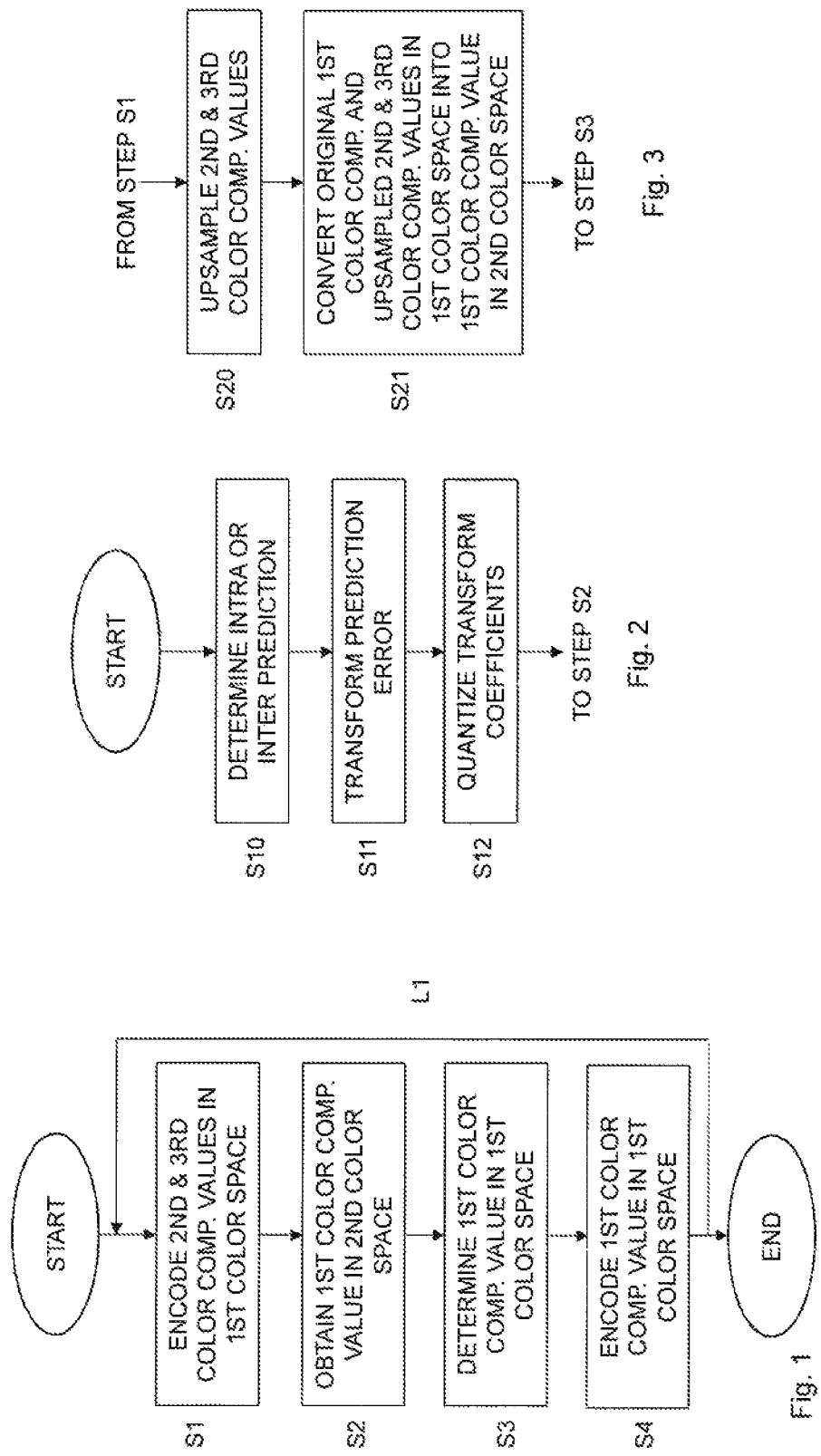

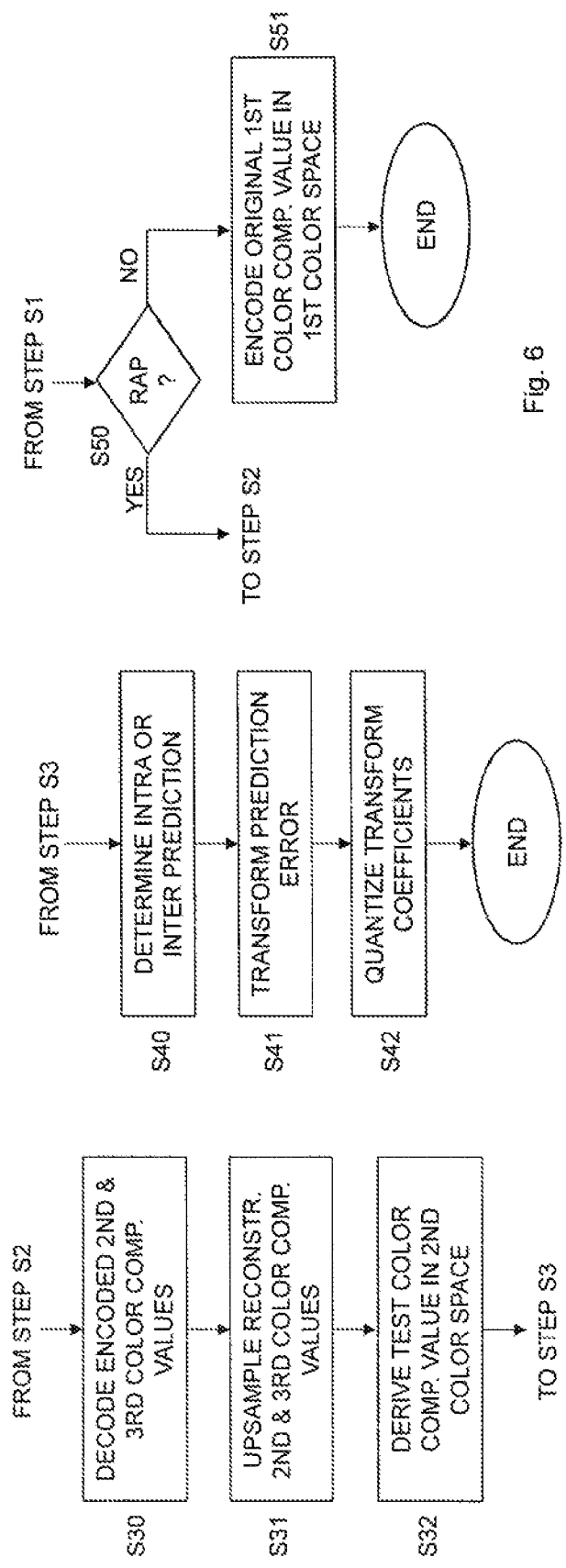

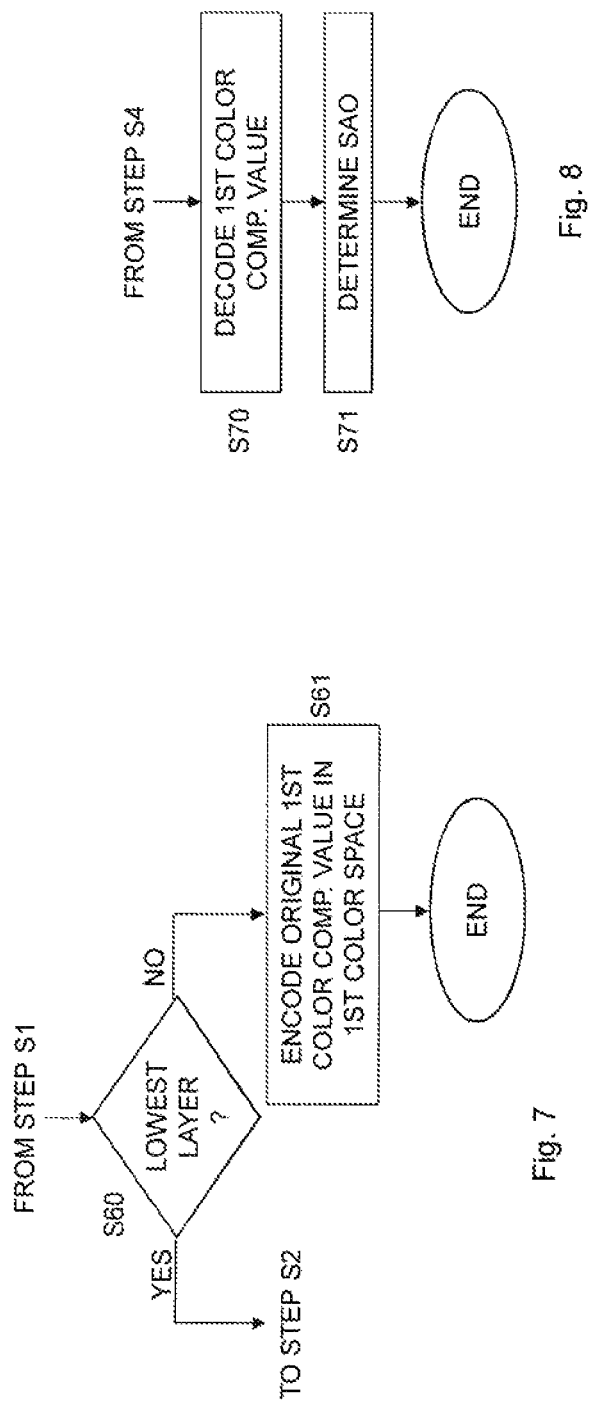

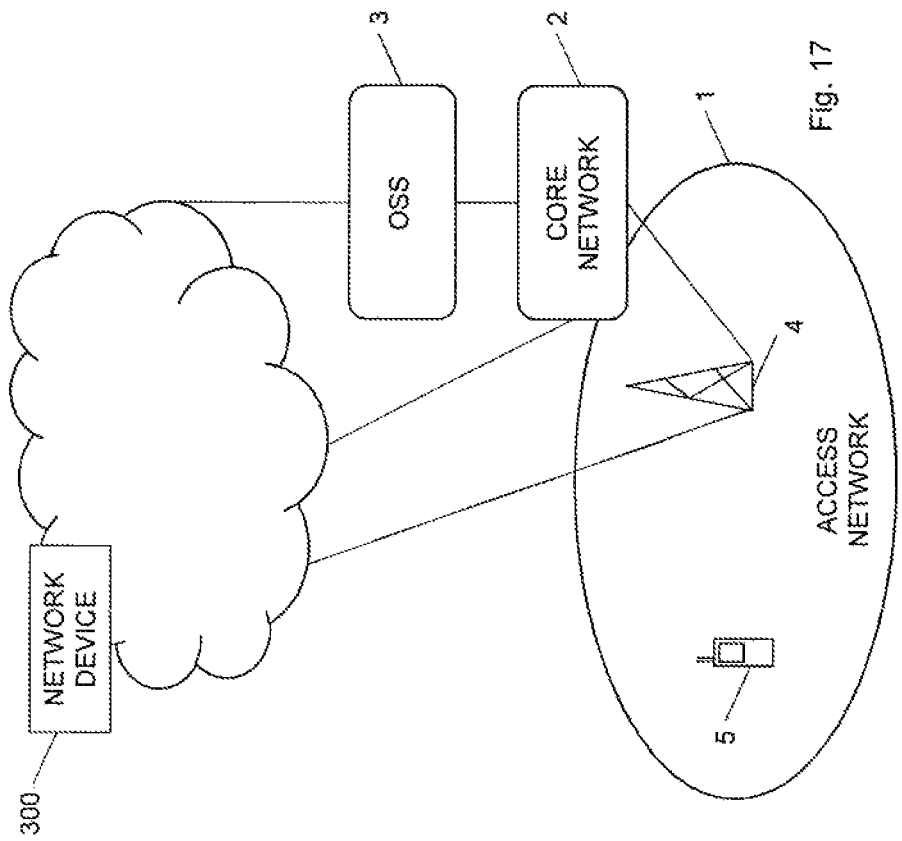
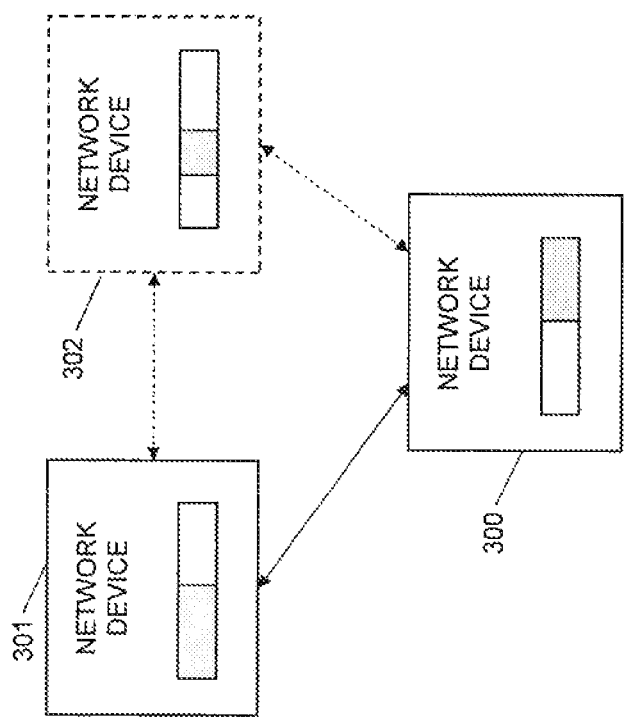

ENCODING A PIXEL OF AN INPUT VIDEO SEQUENCE

CROSS REFERENCE TO RELATED APPLICATION(S)

This application is a 35 U.S.C. § 371 National Stage of International Patent Application No. PCT/SE2016/050498, filed May 30, 2016, designating the United States and claiming priority to U.S. provisional application No. 62/171,594, filed on Jun. 5, 2015. The above identified applications are incorporated by reference.

TECHNICAL FIELD

The present embodiments generally relate to a method, devices and a computer program for encoding a pixel of an input video sequence.

BACKGROUND

High Dynamic Range (HDR) has become an increasingly hot topic within the TV and multimedia industry in the last couple of years. While screens capable of displaying the HDR video signal are emerging at the consumer market. Over-The-Top (OTT) players, such as Netflix, have announced that HDR content will be delivered to the end-user. Standardization bodies are working on specifying the requirements for HDR. For instance, in the roadmap for Digital Video Broadcasting (DVB), Ultra High Definition Television (UHDTV) phase 2 will include HDR support. Moving Picture Experts Group (MPEG) is currently working on exploring how HDR video could be compressed.

HDR imaging is a set of techniques within photography that allows for a greater dynamic range of luminosity compared to standard digital imaging. Dynamic range in digital cameras is typically measured in f-stops, where 1 f-stop is a doubling of the amount of light. A standard Liquid Crystal Display (LCD) High Definition Television (HDTV) using Standard Dynamic Range (SDR) can display less than or equal to 10 stops. HDR is defined by MPEG to have a dynamic range of over 16 f-stops.

During video encoding, also referred to as compression, the luma component Y' and the two chroma components Cb' and Cr' are typically handled independently, since they are standardized to be independent during decoding, also referred to as decompression. However, after decoding, the reconstructed luma and chroma components are converted into a red, green, blue RGB color. Thus, if the conversion to RGB to be done after decoding is taken into account, the luma and chroma components are no longer independent.

As a consequence, an error in, for example, the chroma component Cb' or Cr' during encoding will introduce an error in the R, G and B color components. In particular, it might lead to an incorrect luminance, which is what our eyes are most sensitive to.

Thus, there is a need for improvement within encoding of video sequences.

SUMMARY

It is a general objective to provide an improved encoding of pixels of an input video sequence.

This and other objectives are met by embodiments disclosed herein.

An aspect of the embodiments relates to a method of encoding a pixel of an input video sequence. The method comprises encoding a second color component value and a third color component value of the pixel in a first color space. The method also comprises obtaining a first color component value in a second color space for the pixel, wherein the second color space is different from the first color space. The method further comprises determining a first color component value of the pixel in the first color space based on minimizing an error computed based on a difference between the first color component value in the second color space and a test color component value in the second color space, wherein the test color component value is derived based on the encoded second color component value and the encoded third component value. The method additionally comprises encoding the first color component value of the pixel in the first color space.

Another aspect of the embodiments relates to a device for encoding a pixel of an input video sequence. The device is configured to encode a second color component value and a third color component value of the pixel in a first color space. The device is also configured to obtain a first color component value in a second color space for the pixel, wherein the second color space is different from the first color space. The device is further configured to determine a first color component value of the pixel in the first color space based on minimizing an error computed based on a difference between the first color component value in the second color space and a test color component value in the second color space, wherein the test color component value is derived based on the encoded second color component value and the encoded third component value. The device is additionally configured to encode the first color component value of the pixel in the first color space.

A further aspect of the embodiments relates to a device for encoding a pixel of an input video sequence. The device comprises encoding means for encoding a second color component value and a third color component value of the pixel in a first color space. The device also comprises obtaining means for obtaining a first color component value in a second color space for the pixel, wherein the second color space is different from the first color space. The device further comprises modifying means for determining a first color component value of the pixel in the first color space based on minimizing an error computed based on a difference between the first color component value in the second color space and a test color component value in the second color space, wherein the test color component value is derived based on the encoded second color component value and the encoded third component value. The device additionally comprises encoding means for encoding the first color component value of the pixel in the first color space.

Yet another aspect of the embodiments relates to a computer program comprising instructions, which when executed by a processor, cause the processor to encode a second color component value and a third color component value, of a pixel of an input video sequence, in a first color space. The processor is also caused to obtain a first color component value in a second color space for the pixel, wherein the second color space is different from the first color space. The processor is further caused to determine a first color component value of the pixel in the first color space based on minimizing an error computed based on a difference between the first color component value in the second color space and a test color component value in the second color space, wherein the test color component value is derived based on the encoded second color component value and the encoded third component value. The processor is additionally caused to encode the first color component value of the pixel in the first color space.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

Another aspect of the embodiments relates to a signal representing an encoded version of a pixel of an input video sequence picture. The encoded version comprises a first color component value, a second color component value and a third color component value in a first color space encoded according to method above or by the device according to above.

The embodiments provide an improved encoding of pixels in an input video sequence by taking into account any errors already introduced by the encoder in the encoding of the second and third color component values for the pixel when encoding the first color component value of the pixel. As a result of the improved encoding, the visual quality, such as seen in luminance of the pixel, may be improved.

BRIEF DESCRIPTION OF THE DRAWINGS

The embodiments, together with further objects and advantages thereof, may best be understood by making reference to the following description taken together with the accompanying drawings, in which:

FIG. 1 is a flow chart illustrating a method of encoding a pixel according to an embodiment;

FIG. 2 is a flow chart illustrating an embodiment of the encoding step S1 in FIG. 1;

FIG. 3 is a flow chart illustrating an embodiment of the obtaining step S2 in FIG. 1;

FIG. 4 is a flow chart illustrating additional, optional steps of the method in FIG. 1 according to an embodiment;

FIG. 5 is a flow chart illustrating an embodiment of the encoding step S4 in FIG. 1;

FIG. 6 is a flow chart illustrating additional, optional steps of the method in FIG. 1 according to another embodiment;

FIG. 7 is a flow chart illustrating additional, optional steps of the method in FIG. 1 according to a further embodiment;

FIG. 8 is a flow chart illustrating additional, optional steps of the method in FIG. 1 according to yet another embodiment;

FIG. 16 schematically illustrate a distributed implementation of the embodiments among multiple network devices;

FIG. 17 is a schematic illustration of an example of a wireless communication system with one or more cloud-based network devices according to an embodiment;

DETAILED DESCRIPTION

Figure 9:
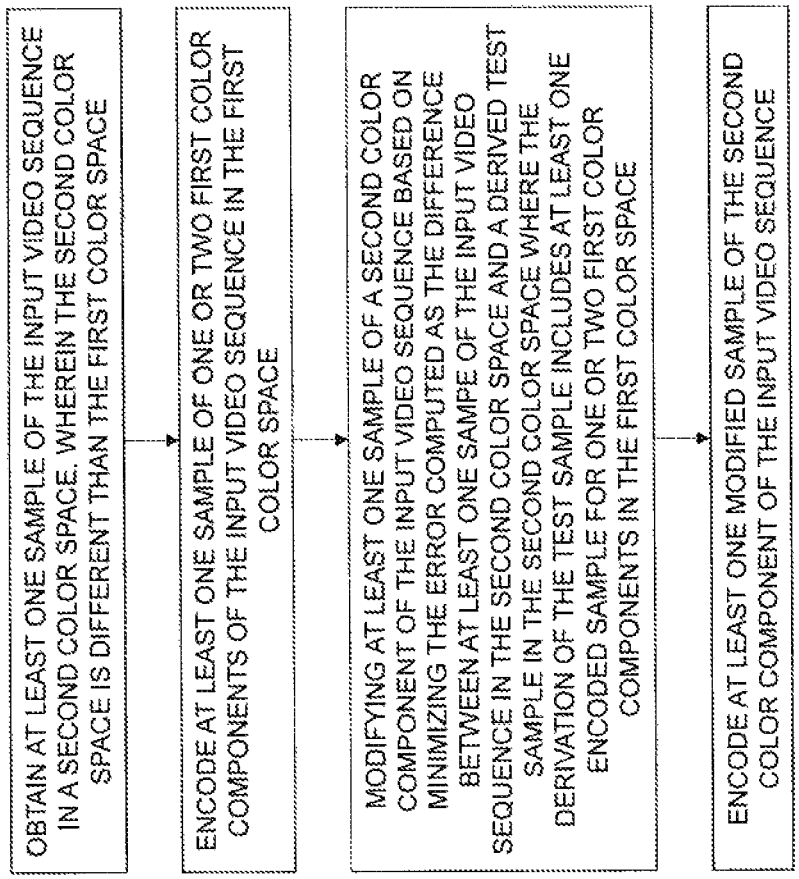
FIG. 9 is a flow chart illustrating a method for encoding at least one sample of an input video sequence according to an embodiment.

Throughout the drawings, the same reference numbers are used for similar or corresponding elements.

The present embodiments generally relate to a method, devices and a computer program for encoding a pixel of an input video sequence.

In video coding, several different color spaces or formats are used to represent color values. In this document the following terminology is used:

RGB: Linear RGB values, where each value is proportional to the $cd/m^2$ ("number of photons").

XYZ: Linear XYZ values in the CIE 1931 color space, where each value is a linear combination of RGB. Y is called "luminance" and reflects well what the eye perceives as brightness. The XYZ space is important because it maps well to the color perception of the human visual system. In an embodiment, it is in this color space that we want to minimize the error introduced by the compression or encoding.

pq(Y)xy: Non-linear XYZ values, which correspond best to human color perception. pq(Y) is a non-linear representation where the non-linear function pq(.) has been applied to the linear luminance Y. xy is a non-linear representation of chrominance, since it has been normalized for "brightness" through x=X/(X+Y+Z), y=Y/(X+Y+Z).

pq(Y)u'v': Representation of color where pq(Y) contains all the luminance and u'v' all the chrominance. From pq(Y) it is possible to extract Y, and from Y, u' and v' it is possible to extract XYZ, which can be transformed into RGB.

R'G'B': Non-linear RGB values. R'=pq(R), G'=pq(G), B'=pq(B), pq(.) being a non-linear function.

Y'Cb'Cr': A non-linear representation, where each value is a linear combination of R', G' and B'. Y' is called "luma", and Cb' and Cr' are collectively called "chroma". This is to distinguish Y' from luminance, since Y' also contains some chrominance, and Cb' and Cr' also contains some luminance. Y'Cb'Cr' values are what is typically encoded and compressed by video encoders. After decoding, they will be converted to R'G'B' and then to RGB that can be displayed.

ICtCp: A representation of color designed for HDR and Wide Color Gamut (WCG) imagery and is intended as an alternative to Y'Cb'Cr'. I represents intensity and is a representation of luma information, whereas CtCp carries chroma information.

Yopt'—Optimal Y' derived such that the error in Y is minimized.

4:2:0—The second and third color components, such as the chroma components, have been subsampled horizontally and vertically by a factor of two compared to the first color component, such as the luma component.

4:2:2—The second and third color components, such as the chroma components, have been subsampled horizontally or vertically by a factor of two compared to the first color component, such as the luma component.

4:4:4—No subsampling has been applied, or subsampling and following upsampling have been applied, i.e. all components are of the same resolution.

The embodiments are based on adapting a target value for coding of one color component given compression or encoding of at least one other color component and the processing that takes place on decompressed or decoded video before display. An approach to do this is to modify a perceptually quantized original first color component value, such as Y' value, given reconstructed, i.e. subsampled, coded, decoded and upsampled, second and third color component values, such as Cb'Cr' values, and the processing that takes place on the decompressed or decoded video before display so that it better corresponds to the original linear luminance, such as Y, or original perceptually quantized linear luminance, such as pq(Y).

FIG. 1 is a flow chart illustrating a method of encoding a pixel of an input video sequence. The method comprises encoding, in step S1, a second color component value and a third color component value of the pixel in a first color space. The method also comprises obtaining, in step S2, a first color component value in a second color space for the pixel. The second color space is different from the first color space. The method then continues to step S3, which comprises determining a first color component of the pixel in the first color space. This first color component value is determined in step S3 based on minimizing an error computed based on a difference between the first color component value in the second color space and a test color component value in the second color space. The test color component value is derived based on the encoded second color component value and the encoded third color component value. Then, in step S4 the first color component value of the pixel in the first color space is encoded.

An encoded representation of the pixel thereby comprises the encoded first color component value from step S4 and the encoded second and third color component values from step S1.

The method steps S1 to S4 shown in FIG. 1 are performed for at least one pixel of an input video sequence comprising multiple, i.e. at least two, pictures and where each picture comprises a plurality of pixels. In a preferred embodiment, the method is applied to multiple pixels in a picture of the input video sequence, such as to all pixels in the picture, which is schematically illustrated by the line L1 in FIG. 1. The method may also be applied to pixels of a still image or picture.

The method of encoding a pixel in FIG. 1 thereby adapts, in step S3, the first color component value for encoding based on the encoding of the second and third color component values in step S1 and preferably the processing that takes place on decoded video prior to display. The optimal first color component value for the pixel in the first color space is determined based on a comparison of the values of the first color component and a test color component in a second color space, which is preferably a color space that the human visual system perceives. The adaptation of the optimal first color component value based on the encoding and decoding process is achieved, at least partly, by deriving the test color component value based on the encoded second and third color component values from step S1.

FIG. 2 is a flow chart illustrating an embodiment of the encoding step S1 in FIG. 1. In this embodiment, steps S10 to S12 are performed for each color component value of the second color component value and the third color component value. Step S10 comprises determining an intra or inter prediction of the color component value. A prediction error calculated as a difference between the color component value and the intra or inter prediction is then transformed in step S11 to form transform coefficients. The transform coefficients from step S11 are quantized in step S12. The quantized transform coefficients are then an encoded version of the color component value. In an optional embodiment, the quantized transform coefficients are input to an encoder, such as an entropy encoder, to be encoded. The method then continues to step S2 in FIG. 1.

Generally, intra prediction involves finding an intra (I) prediction or spatial prediction of the color component value based on values of neighboring pixels within the same picture as the current pixel. Thus, intra prediction uses data from neighboring prediction blocks of pixels that have been previously decoded from within the same picture.

Correspondingly, inter prediction involves motion compensation in which the prediction of the pixels in a block of pixels in a current picture is derived based on the pixel values in a block of pixels in a previously decoded picture of the video sequence or based on the pixel values in blocks of pixels in two previously decoded pictures of the video sequence. Inter prediction is also referred to as temporal prediction and is thereby achieved using inter (P) or bi-directional inter (B) prediction from previously decoded reference pictures.

The difference between the original pixel data and the predicted pixel data, referred to as the prediction error or residual, is transformed into the frequency domain and quantized using a quantization parameter (QP).

For more information of intra and inter prediction reference is made to sections 8.4 and 8.5 in the document [4]. Section 8.6 in the document [4] contains more information with regard to transforming prediction errors and quantizing transform coefficients.

The encoding of the second and third color component values in step S1 could be performed in accordance with known video coding/decoding standards, such as High Efficiency Video Coding (HEVC), also referred to as H.265; H.264/Advanced Video Coding (AVC); video coding/decoding standards for HDR or Wide Color Gamut (WCG) video; etc. In the latter case, the input video sequence is a HDR or WCG video sequence.

FIG. 3 is a flow chart illustrating an embodiment of step S2 in FIG. 1. The method continues from step S1 in FIG. 1 or step S12 in FIG. 2. In this embodiment, the second color component value and the third color component value in the first color space are upsampled in step S20 to obtain an upsampled second color component value and an upsampled third color component value in the first color space. The method then continues to step S21, which comprises converting an original first color component value of the pixel in the first color space and the upsampled second color component value and the upsampled third color component value in the first color space into the first color component value in the second color space. The method then continues to step S3 in FIG. 1.

The second and third color components are preferably in a subsampled form, such as 4:2:0 or 4:2:2 format. Upsampling in step S20 can be performed according to known upsampling techniques. For instance, upsampling could be performed by using bilinear or longer filters. An example of upsampling technique that can be used according to the embodiments is disclosed in section B.1.5.6 Chroma upsampling from 4:2:0 to 4:4:4 (Y'CbCr domain) in document [5]. The result of the upsampling in step S20, is the upsampled second and third color component values in the 4:4:4 format.

In an embodiment, the second and third color components are chroma components Cb'Cr' 4:2:0 or 4:2:2 in the Y'Cb'Cr' color space. The upsampling in step S20, thereby generates Cb'Cr' component values in the 4:4:4 format. In this embodiment, the original first color component value is an original Y' value in the Y'Cb'Cr' format. Generally, the pixels of the input video sequence to be encoded have an original Y'Cb'Cr' color in 4:2:0 or 4:2:2. In such a case, the original Y' value is the input luma component value of the pixel, with the second and third color component values being the input subsampled chroma component values for the pixel. The Y' 4:4:4 value and the Cb'Cr' 4:4:4 values are then converted into the first color component value in the second color space. This first color component value in the second color space could be a linear luminance value Y in the XYZ color space or a non-linear luminance value pq(Y) in the pq(Y)xy color space. Another example is pq(Y) in the pq(Y)u'v' color space. Hence, Y=function(Y', Cb', Cr') or pq(Y)=function (Y', Cb', Cr').

In the first case, i.e. Y=function(Y', Cb', Cr'), the conversion in step S21 preferably comprises application of a first color transform to obtain a non-linear color in a third color space, preferably an R'G'B' color in the RGB color space, for instance using equation 1.

$$R'=Y'+1.47460 \times Cr$$

$$G'=Y'-0.16455 \times Cb-0.57135 \times Cr$$

$$B'=Y'+1.88140 \times Cb \quad \text{(equation 1)}$$

A first transfer function, such as the transfer function in equation A1 in Annex A, is applied to the non-linear color in the third color space to obtain a linear color in the third color space, preferably an RGB color in the RGB color space.

A second color transform is then applied to the linear color in the third color space to obtain the first color component in the second color space, preferably an RGB-to-XYZ color transform, see equation 2 or 3:

$$X=0.636958R+0.144617G+0.168881B$$

$$Y=0.262700R+0.677998G+0.059302B$$

$$Z=0.000000R+0.028073G+1.060985B \quad \text{(equation 2)}$$

$$X=0.412391R+0.357584G+0.180481B$$

$$Y=0.212639R+0.715169G+0.072192B$$

$$Z=0.019331R+0.119195G+0.950532B \quad \text{(equation 3)}$$

In fact, only the second line in equation 2 or 3 needs to be calculated in order to obtain the linear luminance component value Y in the XYZ color space, i.e. the first color component value in the second color space in this embodiment.

The above described embodiment can thereby be described as involving the following method steps: Y'Cb'Cr' 4:2:0-(upsampling)->Y'Cb'Cr' 4:4:4-(color transform)->R'G'B' 4:4:4-(transfer function)->RGB 4:4:4-(color transform)->XYZ 4:4:4 and then keeping Y, or as shown below, converting Y to pq(Y).

In the second case, i.e. pq(Y)=function(Y', Cb', Cr'), the conversion in step S21 could be performed as described above upto calculating the linear luminance component value Y in the XYZ color space. A second transfer function, such as the inverse of the transfer function in equation A1 in Annex A, is then applied to the linear luminance component value to obtain the non-linear luminance component value pq(Y) in the pq(Y)xy color space, i.e. the first color component value in the second color space in this embodiment.

In these embodiments, the original first color component value in the first color space (Y') is preferably determined according to the Ajusty method in Annex A.

In another embodiment, the first color component value in the second color space is obtained based on a linear color of the pixel in the third color space, such as an RGB 4:4:4 color. This linear color in the third color space, is in an embodiment, an original color of the pixel prior to any pre-encoding processing. The pre-encoding processing then involves converting the linear color in the third color space (RGB 4:4:4) into the first, second and third color component values in the first color space, i.e. Y'Cb'Cr' 4:2:0. If the linear color in the third color space is available at the encoder, then the first color component value in the second color space can be directly calculated therefrom by application of a color transform, such as shown in equation 2 or 3.

This embodiment can thereby be described as involving the following method steps: RGB 4:4:4-(color transform)->XYZ 4:4:4 and then keeping Y, or converting Y to pq(Y).

In yet another embodiment, the encoder has access to the second and third color component values in the first color space in an unsampled form, i.e. prior to subsampling. In such a case, the first color component value can be calculated from this Y'Cb'Cr' 4:4:4 color according to the following method steps:

Y'Cb'Cr' 4:4:4-(color transform)->R'G'B' 4:4:4-(transfer function)->RGB 4:4:4-(color transform)->XYZ 4:4:4 and then keeping Y, or converting Y to pq(Y).

The above presented embodiments of obtaining the first color component value in the second color space can be performed as a pre-step and not necessarily per block of pixels. For instance, it is possible to determine the first color component value in the second color space for the whole picture, or at least a portion thereof, prior to starting the encoding.

It may also be possible to send pre-calculated first color component values in the second color space as an extra input signal to the encoder.

FIG. 4 is a flow chart illustrating additional, optional steps of the method shown in FIG. 1. The method continues from step S1 in FIG. 1 or step S21 in FIG. 3. A next step S30 comprises decoding the encoded second color component value and the encoded third color component value to obtain a reconstructed second color component value and a reconstructed third color component value in the first color space. The reconstructed second and third color component values are then upsampled in step S31 to obtain an upsampled reconstructed second color component value and an upsampled reconstructed third color component value in the first color space. In this embodiment, the test color component value in the second color space is derived in step S32 based on a test color component value in the first color space, the upsampled reconstructed second color component value and the upsampled reconstructed third color component value in the first color space. The method then continues to step S3 in FIG. 1.

The decoding in step S30 is typically an inverse process of the encoding as performed in step S1. Hence, the decoding optionally comprises decoding encoded, quantized transform coefficients, such as using an entropy decoder. The resulting decoding quantized transform coefficients are then inverse quantized and then inverse transformed to obtain the reconstructed residual or prediction errors. The reconstructed second and third color component values are then obtained by adding the reconstructed residuals to the respective intra or inter prediction for the pixel. More information of the decoding process can be found in the document [4], and in particular sections 8.4-8.6 and 9.4.3.

The decoding in step S30 is preferably performed in accordance with available video coding/decoding standards, such as HEVC; H.264/AVC; video coding/decoding standards for HDR or WCG video; etc.

The upsampling in step S31 is preferably performed similar to the upsampling in step S20 in FIG. 3, i.e. upsample from 4:2:0 or 4:2:2 format into 4:4:4. The difference between step S31 and S20 is that step S20 comprises upsampling of original or input second and third color component values, whereas step S31 comprises upsampling of reconstructed second and third and color component values obtained following encoding and then decoding the original or input second and third color component values.

The test color component value ($Y_{test}$ or $pq(Y)_{test}$) in the second color space, preferably XYZ or pq(Y)xy color space, is then derived in step S32 based on the test color component value ($Y'_{test}$) and the upsampled reconstructed second and third color component values (Cb'Cr') in the first color space, preferably Y'Cb'Cr' color space. Hence, $Y_{test}$=function($Y'_{test}$, Cb', Cr') or $pq(Y)_{test}$=function($Y'_{test}$, Cb', Cr').

This step S32 is preferably performed as previously described in connection with step S21 in FIG. 3 with the difference that the original first color component value in the first color space is replaced by the test color component value in the first color space, the upsampled second and third color component values in the first color space are replaced by the upsampled reconstructed second and third color component values in the first color space and the first color component value in the second color space is replaced by the test color component value in the second color space.

The above described embodiment can thereby be described as involving the following method steps: $Y'_{test}$Cb'Cr' 4:2:0-(upsampling)->$Y'_{test}$Cb'Cr' 4:4:4-(color transform)->R'G'B' 4:4:4-(transfer function)->RGB 4:4:4-(color transform)->$XY_{test}Z$ 4:4:4 and then keeping $Y_{test}$ or as shown below, converting $Y_{test}$ to $pq(Y_{test})$.

The test color component value ($Y_{test}$ or $pq(Y)_{test}$) in the second color space is, as described above, derived, in an embodiment, based on upsampled reconstructed second and third color component values (Cb'Cr') in the first color space. These upsampled reconstructed second and third color component values thereby reflect and contain any errors introduced during subsampling of the second and third color component values and/or other pre-encoding processing of the second and third color component values, and/or the encoding of the second and third color component values (step S1 in FIG. 1), and/or during the processing performed following the decoding (step S31 in FIG. 4). The first color component value (Y') of the pixel in the first color space can then be determined in step S3 of FIG. 1 to compensate for any errors introduced during the encoding, decoding and post-decoding processing. As a consequence, the visual quality, such as assessed by the linear or non-linear luminance value, Y or pq(Y), of the pixel, can thereby be improved.

In an embodiment, step S3 in FIG. 1 comprises selecting the test color component value in the first color space that minimizes the error computed based on the difference between the first color component value in the second color space and the test color component value in the second color space derived based on a test color component value in the first color and the encoded second and third color component values.

Hence, in an embodiment multiple test color component values in the first color space are available and tested. In such a case, a respective test color component value in the second color space is derived for each of the multiple test color component values in the first color space, preferably as described above in connection with step S32 in FIG. 4. A respective error is then calculated for each of the multiple test color component values in the first color space based on the difference the first color component value in the second color space, such as derived as described above in connection with step S21 in FIG. 3, and the respective first color component value in the second color space.

The first color component value in the first color space among the multiple test color component values in the first color space that results in the smallest error is then selected and used as optimal first color component value in the first color space for the pixel in step S3. This optimal first color component value is then encoded in step S4 in FIG. 1.

The selection of optimal first color component value in the first color space can be performed according to various embodiments in similarity to what is described in Annex A. In these embodiment, the first color component value in the first color space is a luma or Y' value in the Y'Cb'Cr' color space and the first color component value in the second color space is a linear luminance or Y value in the XYZ color space or a non-linear luminance or pq(Y) value in the pq(Y)xy color space.

In an embodiment, a binary search could be used to find the optimal or best Y' value in the Y'Cb'Cr' color space. For instance, first a test Y' value in the middle of the available range of Y' values is tried, for instance 512 if the minimum Y' value is 0 and the maximum Y' value is 1023. If the test Y or pq(Y) value derived in step S32 based on this test Y' value and the upsampled reconstructed Cb'Cr' values is larger than the original Y or pq(Y) value from step S21, we should continue the search in the interval [0, 512]. If the test Y or pq(Y) value instead is larger than the original Y or pq(Y) value, we should continue the search for optimal test Y' value in the interval [512, 1023]. The procedure is continued by calculating a new test Y' value in the middle of the selected interval and proceeds until the test Y or pq(Y) value is equal to the original Y or pq(Y) value, or does not differ from the original Y or pq(Y) value with more than a defined value, or the interval contains a single value or two values, such as [363, 363] or [363, 364]. This is guaranteed to only take $\log_2(N)$ steps, where N is the number of possible test Y' values, which in this example is 1024. Hence, the binary search takes only $\log_2(1024)=10$ steps.

Yet another way to calculate the optimal or best Y' value is to see the determination in step S3 as an optimization problem and minimizing the error $E=(Y_{test}-Y_o)^2$ or $E=(pq(Y_{test})-pq(Y_o))^2$ with respect to $Y'_{test}$, wherein $Y_o$ denotes the original luminance value of the pixel as derived in step S21 in FIG. 3. This can be done by gradient descent, by calculating the gradient of E with respect to $Y'_{test}$, $dE/dY'_{test}$, and update $Y'_{test}$ a small amount in the opposite direction of the gradient: $Y'_{test,\ n+1}=Y'_{test,\ n}-\alpha dE/dY'_{test}$, where $\alpha$ is a small constant.

Gradient descent can be slow, so a quicker way may be to use a second-order optimization algorithm that calculates or approximates the second order derivates $d^2E/dY'^2_{test}$, such as Gauss-Newton.

The above mentioned gradient descent and second-order optimization algorithms are all equivalent to determining the first color component value of the pixel in the first color space based on minimizing an error computed based on the difference between the first color component value in the second color space and the test color component value in the second color space.

It is also possible to include other components in the error. For instance, the error E could be defined as $E=w_1(pq(Y_{test})-pq(Y_o))^2+w_2(x_{test}-x_o)^2+w_3(y_{test}-y_o)^2$, wherein $x_o$, $y_o$ are obtained together with $pq(Y_o)$ from XYZ 4:4:4 as previously described herein and $w_1$, $w_2$, $w_3$ are different weights. A similar approach can also be used by replacing $pq(Y_{test})$ and $pq(Y_o)$ with $Y_{test}$ and $Y_o$, respectively.

Another way to find the optional or best Y' value is to perform a linearization as further described in Annex A. In such an approach, we have Y=f(Y') and we want the output value Y of this equation to match the optimal $Y_o$. Since the Y depends on Y' in three different places in a nonlinear way, there seems to be no easy way to invert the function so that we can get $Y'=f^{-1}(Y)$.

However, it is possible to linearize the non-linear transfer function tf(x)~kx+m. Doing this in the three different places gives Y~k1×Y'+m1+k2×Y'+m2+k3×Y'+m3, which is equivalent to Y~(k1+k2+k3)×Y'+(m1+m2+m3). This can be inverted to Y'~Y'k=($Y_o$−(m1+m2+m3))/(k1+k2+k3).

Thus it is likely that Y'k will produce a value Y'k closer to $Y_o$ than before. The function can be linearized again at this new point Y'k, resulting in a new value Y'k+1, etc.

Thus, in this approach the Y', Cb' and Cr' are converted to R', G' B' using $$R'=Y'+a13*Cr'$$

$$G'=Y'-a22*Cb'-a23*Cr'$$

$$B'=Y'+a32*Cb'$$

where a13, a22, a23 and a32 are positive constants that depend on which color space is used. For BT.2020 we have a13=1.4746, a22=0.1646, a23=0.5714, and a32=1.8814. For ease of notation we introduce the helper variables:

$$Rt=a13*Cr'$$

$$Gt=-a22*Cb'-a23*Cr'$$

$$Bt=a32*Cb',$$

which means that the conversion can instead be written $$R'=Y'+Rt$$

$$G'=Y'+Gt$$

$$B'=Y'+Bt.$$

We can now calculate the luminance as $$Y=w_R tf(R')+w_G tf(G')+w_B tf(B'),$$

where $W_R$, $W_G$ and $w_B$ are constants such as the CIE1931 XYZ constants for Y or the (similar) constants for BT2020, for instance $w_R$=0.2627, $w_G$=0.6780, $w_B$=0.0593. Using the equation above, we can write this as $$Y=w_R tf(Y'+Rt)+w_G tf(Y'+Gt)+w_B tf(Y'+Bt).$$

In this formula, only Y' is allowed to vary per pixel. As an example, Rt depends on Cr', which is shared between several pixels. We can, thus, regard Rt, Gt and Bt as constants and the idea with luma adjustment is to find the Y' that will generate the desired luminance $Y_o$. Note that since there are three non-linear functions in the right hand side of the equation above, it is not possible to invert the right hand side. Therefore we instead introduce a linear approximation of tf(•) for the red component.

$$tf(x) \approx tf(R_O')+(x-R_O')tf'(R_O'),$$

where $R_O'$ is the transformed version of the linear component $R_O$ of the original pixel $R_O'=tf^{-1}(R_O)$. Doing the same for the green and blue components gives $$Y \approx wR(tf(R_O')+(Y'+Rt-R_O')tf'(R_O'))+$$
$$wG(tf(G_O')+(Y'+Gt-G_O')tf'(G_O'))+$$
$$wB(tf(B_O')+(Y'+Bt-B_O')tf'(B_O'))$$

Moving the first term in each expression to the left hand side, we get $$Y-w_R tf(R_O')-w_G tf(G_O')-w_B tf(B_O') \approx w_R(Y'+Rt-R_O')tf'(R_O')+$$
$$w_G(Y'+Gt-G_O')tf'(G_O')+w_B(Y'+Bt-B_O')tf'(B_O').$$

But since $R_O=tf(R_O')$, the negative terms of the first line sum to the original luminance and the first line becomes zero. Collecting terms for Y' now gives $$Y'(w_R tf'(R_O')+w_G tf'(G_O')+w_B tf'(B_O')) \approx w_R((Rt-R_O')tf'(R_O'))+w_G((Gt-G_O')tf'(G_O'))+w_B((Bt-B_O')tf'(B_O'))$$

and we can thus calculate Y' as $$Y' \approx \frac{w_R((Rt-R_O')tf'(R_O'))+w_G((Gt-G_O')tf'(G_O'))+w_B((Bt-B_O')tf'(B_O'))}{w_R tf'(R_O')-w_G tf'(G_O')+w_B tf'(B_O')}.$$

The above described embodiments indicate that a linearization process can be used to determine the first color component value of the pixel in the first color space, Y', and that such a linearization process is equivalent to determine Y' based on minimizing an error as described in the foregoing.

Yet another way to find the optimal or best Y' value is to use a look-up table (LUT). If we have Cb'Cr' values and the target Y or pq(Y) value, i.e. $Y_o$ or $pq(Y_o)$, it is possible to find the best Y' value using any of the iterative techniques mentioned above. Hence, it is possible to create a LUT for every possible combination of Cb'Cr' and Y or pq(Y). Assume for instance that Cb' and Cr' is quantized to 10 bits and that Y or pq(Y) is also quantized to 10 bits. Then a LUT with $2^{10} \times 2^{10} \times 2^{10}=2^{30}$ Y' values is needed. If each Y' value is in two bytes, this means $2^{31}$ bytes or 2 Gb. It is however, possible to prune the LUT, for example through rounding one or more of Cb', Cr' and $Y_o$ or $pq(Y_o)$ to 6 or 8 bits. Then the LUT size would be $2^{18}$ or $2^{24}$ Y' values or $2^{19}$ or $2^{25}$ bytes, which is equivalent to 512 kbytes or 34 Mbytes.

Hence, in these embodiments optimal or best Y' value=LUT(Cb', Cr', $Y_o$) or LUT(Cb', Cr', $pq(Y_o)$).

FIG. 5 is a flow chart illustrating an embodiment of step S4 in FIG. 1. The method continues from step S3 in FIG. 1. A next step S40 comprises determining an intra or inter prediction of the first color component value in the first color space. The following step S41 comprises transforming a prediction error calculated as a difference between the first color component value in the first color space and the intra or inter prediction to form transform coefficients. The transform coefficients are then quantized in step S42. In an optional embodiment, the quantized transform coefficients are input to an encoder, such as an entropy encoder.

Steps S40-S42 in FIG. 5 are basically performed as previously described herein with reference to FIG. 2, with the difference that FIG. 2 involved encoding the second and third color component values in the first color space and FIG. 5 involves encoding the first color component value in the first color space.

As was mentioned in the foregoing, the encoding of a pixel according to the embodiments could be applied to multiple pixels in a picture of an input video sequence. It is indeed possible to apply the method of encoding to all pixels in all pictures. In an alternative embodiment, the method of encoding is only selected for some pixels, regions or pictures within the input video sequence. A reason of this is that the method of encoding can introduce extra complexity as compared to a prior art method of simply encoding the original Y'Cb'Cr' 4:2:0 or 4:2:2 color of a pixel. The present embodiments provide additional processing in order to determine an improved or optimized luma component value. The increase in quality as achieved by the embodiments thereby come at a cost of somewhat increased processing or complexity at the encoding side.

Accordingly, it could be advantageous to apply the method of encoding only for some regions in some pictures or some key pictures. Non-limiting examples of such key pictures could be so-called random access point (RAP) pictures, also referred to as intra random access pictures (IRAP), or pictures at the lowest layer in a hierarchical group of pictures (GOP) structure or pictures that have low QP values in low delay coding. It is also possible for an encoder to select the pictures or regions of pictures that should be encoded according to the embodiments based on its processing capabilities and the delay requirements for the current video application.

In an embodiment, the method of FIG. 1 comprises the additional steps as shown in FIG. 6. This embodiment comprises performing the steps of obtaining the first color component value and determining the first color component value if the pixel is a pixel of a RAP picture of the input video sequence.

In this embodiment, the method continues from step S1 in FIG. 1 and step S50 comprises investigating whether the current picture is a RAP picture. If the current picture is a RAP picture the method continues to step S2 in FIG. 1. However, if the current picture is a non-RAP picture the method instead continues to step S51. This step S51 comprises encoding the first color component value of the pixel in the first color space. This first color component value is the original value of the first color component as input to the encoding process. Hence, in clear contrast to RAP pictures, in which the first color component value in the first color space is determined in step S3 and as previously described herein, for non-RAP pictures the original and input first color component value is used for the pixel and thereby encoded in step S51. The encoded first color component value from step S51 is then used together with the encoded second and third color component values from step S1 as encoded representation of the pixel.

The encoding in step S51 preferably comprises determining an intra or inter prediction of the first color component value, transforming a calculated prediction error and quantizing transform coefficients in correspondence to what has previously been described herein in connection with FIGS. 2 and 5.

Generally, the quality of RAP or IRAP pictures is in particular important in a video sequence. The reason being that other non-RAP/IRAP pictures in the video sequence are directly or indirectly encoded and decoded using the RAP/IRAP pictures as reference pictures. Hence, an error introduced in a RAP/IRAP picture during encoding may be propagated into following pictures that are encoded using the RAP/IRAP picture as direct reference picture or indirect reference picture, i.e. second or further generation reference picture. Accordingly, it is generally important to encode RAP/IRAP pictures with a high quality.

FIG. 7 is a flow chart illustrating additional, optional steps of the method shown in FIG. 1. The method continues from step S1 in FIG. 1. In this embodiment, the method also comprises performing the steps of obtaining the first color component value and determining the first color component value if the pixel is a pixel of a picture in a lowest layer in the input video sequence having pictures organized in a hierarchical GOP structure.

In this embodiment, the method continues from step S1 in FIG. 1 and step S60 comprises investigating whether the current picture belong to the lowest layer in the input video sequence organizing the pictures in a hierarchical GOP structure.

Figure 11:
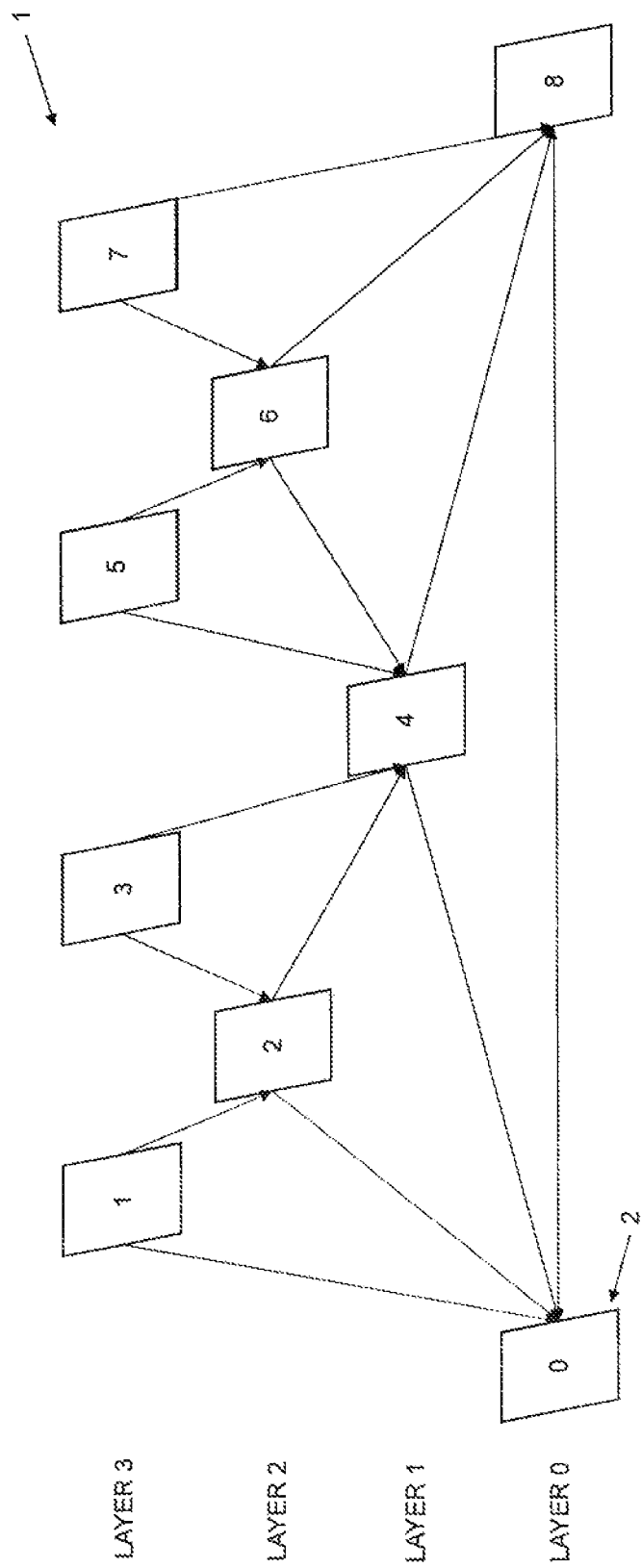
FIG. 11 schematically illustrates pictures of an input video sequence organized in a group of pictures (GOP) structure.

FIG. 11 schematically illustrates an input video sequence 1 organizing the pictures in such a hierarchical GOP structure. In FIG. 11, the GOP starts with a RAP/IRAP picture 2 (number 0). In a typical approach, such RAP/IRAP pictures 2 are positioned with a fixed interval, such as every second. Pictures between the RAP/IRAP pictures 2 are then typically coded with a GOP structure where a picture (number 8) is typically predicted and coded eight pictures ahead of display time and then using that picture (number 8) and previously coded pictures (number 0) to predict and code a picture (number 4) four pictures ahead of display time. Then, pictures (number 2 and 6) two and six pictures ahead of display time are predicted and coded followed by predicting and coding pictures (number 1, 3, 5, 7) one, three, five and seven pictures ahead of display time. The pictures (number 1, 3, 5, 7) in layer 3 belong the highest hierarchical level, pictures (number 2, 6) in level 2 belong to the next highest hierarchical level, the picture (number 4) in layer 1 belongs to the next lowest hierarchical layer and the pictures (number 0, 8) in layer 0 belong to the lowest hierarchical layer. Typically, pictures in the highest hierarchical layer are not used for prediction of any other pictures, i.e. so called non-reference pictures. Non-reference pictures can be removed without destroying the decoding capability of a video bitstream. The GOP structure of FIG. 11 is then repeated until the next IRAP picture.

The arrows in FIG. 11 illustrate the prediction directions for reference pictures. For instance, picture number 4 is encoded using picture numbers 0, 8 as reference pictures.

If the current picture is a picture in the lowest layer, i.e. layer 0 in FIG. 11, the method continues from step S60 in FIG. 6 to step S2 in FIG. 1. However, if the current picture is a picture in a layer higher in the hierarchical GOP structure than the lowest layer, i.e. layer 1-3 in FIG. 11, the method instead continues to step S61. This step S61 comprises encoding the first color component value of the pixel in the first color space. This first color component value is the original value of the first color component as input to the encoding process. Hence, in clear contrast to pictures in the lowest layer, in which the first color component value in the first color space is determined in step S3 and as previously described herein, for pictures in higher layers the original and input first color component value is used for the pixel and thereby encoded in step S61. The encoded first color component value from step S61 is then used together with the encoded second and third color component values form step S1 as encoded representation of the pixel.

This step S61 corresponds to step S51 in FIG. 6.

Generally, the quality of lowest layer pictures is in particular important in a hierarchical or multi-layer video sequence. The reason being that pictures in higher layers in the video sequence are directly or indirectly encoded and decoded using pictures in the lowest layer as reference pictures, see FIG. 11. Hence, an error introduced in a lowest layer picture during encoding may be propagated into following pictures that are encoded using this picture as direct reference picture or indirect reference picture. Accordingly, it is generally important to encode pictures in the lowest layer with a high quality.

FIG. 8 is a flow chart illustrating additional, optional steps of the method shown in FIG. 1. The method continues from step S4 in FIG. 1 or step S42 in FIG. 5. A next step S70 comprises decoding the encoded first color component value to obtain a reconstructed first color component value in the first color space. A next step S71 comprises determining a sample adaptive offset (SAO) that minimizes 1) a squared error or absolute between the first color component value in the first color space and a sum of the reconstructed first color component value in the first color space and the SAO or 2) a rate-distortion cost calculated as a function of a distortion representing a difference between the first color component value in the first color space and the sum of the reconstructed first color component value in the first color space and the SAO and an amount of bits spent for encoding the SAO.

One technology for loop filtering used in HEVC is SAO. When it is specified that SAO is used for a block of pixels, in HEVC vocabulary Coding Tree Unit (CTU), it either modifies pixel values in adjacent bands of pixel values or modify pixel values that have a certain edge characteristic. In the former case, band offsets are defined in four bands or categories where the position of the band with smallest pixel values is specified and the other bands with increasing pixel values follows. In the latter case, edge offsets are defined in four categories: maxima, minima, increasing step or decreasing step, in a specified direction, i.e. edge offset class. The SAOs are specific for each block of pixels but can also be copied from a neighboring block of pixels. SAO can be used independently for respective color component, e.g. luma, and chroma components.

The decoding of the encoded first color component value in step S70 is basically the inverse of the encoding performed in step S4. Hence, the decoding optionally comprises decoding encoded, quantized transform coefficients, such as using an entropy decoder. On the encoder side entropy decoding is not needed since it is a loss less process and since the encoder already has the quantized transform coefficients, etc. The resulting decoding quantized transform coefficients are then inverse quantized and then inverse transformed to obtain the reconstructed residual or prediction error. The reconstructed first color component value is then obtained by adding the reconstructed residual to the intra or inter prediction for the pixel. More information of the decoding process can be found in the document [4], and in particular sections 8.4-8.6 and 9.4.3.

In the first embodiment, the SAO is determined by minimizing the squared error or the absolute error between the first color component value in the first color space as determined in step S3 in FIG. 1 and a sum of the SAO and the reconstructed first color component value obtained in step S70.

In the second embodiment, the SAO is determined by minimizing the rate-distortion (RD) cost J calculated as $J=D+\lambda R$, wherein D is distortion representing a difference between the first color component value in the first color space as determined in step S3 in FIG. 1 and a sum of the SAO and the reconstructed first color component value obtained in step S70, R is the amount of bits spent for encoding the SAO and $\lambda$ is the Lagrange multiplier.

The above described approach can also, or alternatively, be used to determine other offsets or filter parameters traditionally used during encoding and decoding of video sequences. For instance, in-loop filters, such as deblocking filters and adaptive loop filters (ALF), which are further discussed herein, could be determined substantially as described in the foregoing with reference to SAO offsets.

In some applications, it may be advantageous to turn off SAO. For instance, in HEVC may be turned off for 64×64 blocks of pixels.

It is also possible to determine SAO, deblocking filters, ALFs, etc. by minimizing the error or RD cost in the second color space, such as XYZ or pq(Y)xy, instead of the first color space, such as Y'Cb'Cr'. In such a case, step S71 preferably comprises determining a coding tool parameter, such as SAO, in-loop filter, deblocking filter, ALF filter, etc., for at least one color component value in the first color space, that minimizes 1) a squared error or absolute error between the first color component value in the second color space and a sum of the reconstructed first color component value in the second color space and the coding tool parameter converted into the second color space, or 2) a rate-distortion cost calculated as a function of a distortion representing a difference between the first color component value in the second color space and the sum of the reconstructed first color component value in the second color space and the coding tool parameter converted into the second color space and an amount of bits spent for encoding the coding tool parameter.

In a particular embodiment, the method of encoding a pixel in an input video sequence of FIG. 1 comprises encoding, in step S1, chroma component values Cb'Cr' in a Y'Cb'Cr' color space. In this embodiment, step S2 comprises obtaining a luminance value Y for the pixel in a XYZ color space. The following step S3 comprises determining a luma component value Y' of the pixel in the Y'Cb'Cr' color space based on minimizing an error computed based on a difference between the luminance value Y in the XYZ color space and a test luminance value in the XYZ color space, wherein the test luminance value is derived based on the encoded chroma component values Cb'Cr'. Step S4 comprises, in this embodiment, encoding the luma component value Y' in the Y'Cb'Cr' color space.

In another particular embodiment, the method of encoding a pixel in an input video sequence of FIG. 1 comprises encoding, in step S1, chroma component values Cb'Cr' in a Y'Cb'Cr' color space. In this embodiment, step S2 comprises obtaining a non-linear luminance value pq(Y) for the pixel in a pq(Y)xy color space. The following step S3 comprises determining a luma component value Y' of the pixel in the Y'Cb'Cr' color space based on minimizing an error computed based on a difference between the non-linear luminance value pq(Y) in the pq(Y)xy color space and a test luminance value in the pq(Y)xy color space, wherein the test luminance value is derived based on the encoded chroma component values Cb'Cr'. Step S4 comprises, in this embodiment, encoding the luma component value Y' in the Y'Cb'Cr' color space.

In the foregoing, the embodiments have been exemplified with the first color component value in the first color space being the luma component value Y' in the Y'Cb'Cr' color space and the second and third color component values in the first color space being the chroma component values Cb'Cr' in the Y'Cb'Cr' space. This is a preferred implementation example of the embodiment.

However, the embodiments are not limited thereto. ICtCp is an alternative color space, in which the I value carries luma information and the CtCp values carry chroma information. In such an implementation example, the first color component value in the first color space is the I value in the ICtCp color space and the second and third color component values in the first color space are the CtCp values in the ICtCp color space.

In an embodiment, LMS values in the LMS color space can be obtained from RGB values and a color transform according to equation 4:

$$L=(1688*R+2146*G+262*B)/4096$$

$$M=(683*R+2951*G+462*B)/4096$$

$$S=(99*R+309*G+3688*B)/4096 \quad \text{(equation 4)}$$

A transfer function, such as the inverse of $EOTF_{PQ}$, can then be applied to the LMS values in order to obtain non-linear L'M'S' values. Finally, a color transform is applied to these L'M'S' value to obtain the ICtCp values:

$$I=0.5*L'+0.5*M'$$

$$Ct=(6610*L'-13613*M'+7003*S')/4096$$

$$Cp=(17933*L'-17390*M'-543*S')/4096 \quad \text{(equation 5)}$$

This means that it is possible to convert ICtCP values into RGB values, basically by performing the inverse of the above mentioned steps and, then, further convert the RGB values into XYZ or pq(Y)xy values as previously described herein.

An aspect of the embodiments defines a method as illustrated in FIG. 9 for encoding at least one sample of a pixel of an input video sequence. The input video sequence is represented in a first color space. The method comprising:
- obtaining at least one sample of the input video sequence in a second color space, wherein the second color space is different than the first color space,
- encoding at least one sample of one or two first color components of the input video sequence in the first color space,
- modifying at least one sample of a second color component of the input video sequence, i.e. of the first color space, based on minimizing the error computed as the difference between at least one sample of the input video sequence in the second color space and a derived test sample in the second color space where the derivation of the test sample includes at least one encoded sample for one or two first color components in the first color space, and
- encoding at least one modified sample of the second color component of the input video sequence.

The foregoing embodiments have mainly be disclosed in connection with encoding pixels of an input video sequence comprising multiple pictures. The embodiments may, however, also be employed to encode pixels of a still image or picture.

An advantage of certain embodiments is that the encoding takes into account the processing that will be done on the compressed data after decoding, and the error already introduced by the encoder in one or two color channels. The encoder can change the data to be compressed in another color channel in order to produce compressed data that leads to a better result after this processing has been performed.

An encoder is looking to compress a block of pixels that are in Y'Cb'Cr' 4:2:0 or 4:2:2 format. The first step is to apply intra sample or inter sample prediction of the chroma components Cbpred', Crpred', then the prediction errors Cb'-Cbpred', Cr'-Crpred' are transformed. The transformations would typically be done independently, and the resulting transform coefficients quantized, introducing an error in the final pixel values. According to the embodiments, instead of simply transforming the prediction error for the luma component, Y'-Y'pred, the encoder may attempt to find new Y' values (Yopt') for the block of pixels that minimize the error after converting them together with the decoded Cb' and Cr' values into pq(Y)xy or XYZ space, compared to the original pq(Y)xy or XYZ values. Thus, in such an approach the prediction error for the luma component, Yopt'-Y'pred, would instead be transformed.

An approach is to only consider the effect on the luminance component. In this case, the encoder first determines the original luminance. This is done by upsampling the original Y'Cb'Cr' 4:2:0 or 4:2:2 into 4:4:4, then converting through RGB into pq(Y)xy or XYZ. Then we apply an optimization procedure very similar to the one used in the Ajusty method as described in Annex A, in order to find values for Y' in each pixel that lead to values of pq(Y) or Y that best match the original values when converted in a similar fashion together with the compressed versions of Cb' and Cr'.

According to a further embodiment an encoder is configured to apply intra sample or inter sample prediction to a block of pixels that are in Y'Cb'Cr' 4:2:0 or 4:2:2 format. The first step is to apply intra sample or inter sample prediction of the chroma components Cbpred', Crpred'. The predictions would typically be done independently. Now instead of simply applying prediction of the luma component, the encoder would attempt to find new Y' values (Yopt') for the block that minimize the error after converting them together with the predicted Cb' and Cr' values into pq(Y)xy or XYZ space, compared to the original pq(Y)xy or XYZ values.

According to another embodiment the original luminance Y and/or original xy is given to the encoder instead of being derived from the Y'Cb'Cr' 4:2:0 or 4:2:2 samples.

Figure 10:
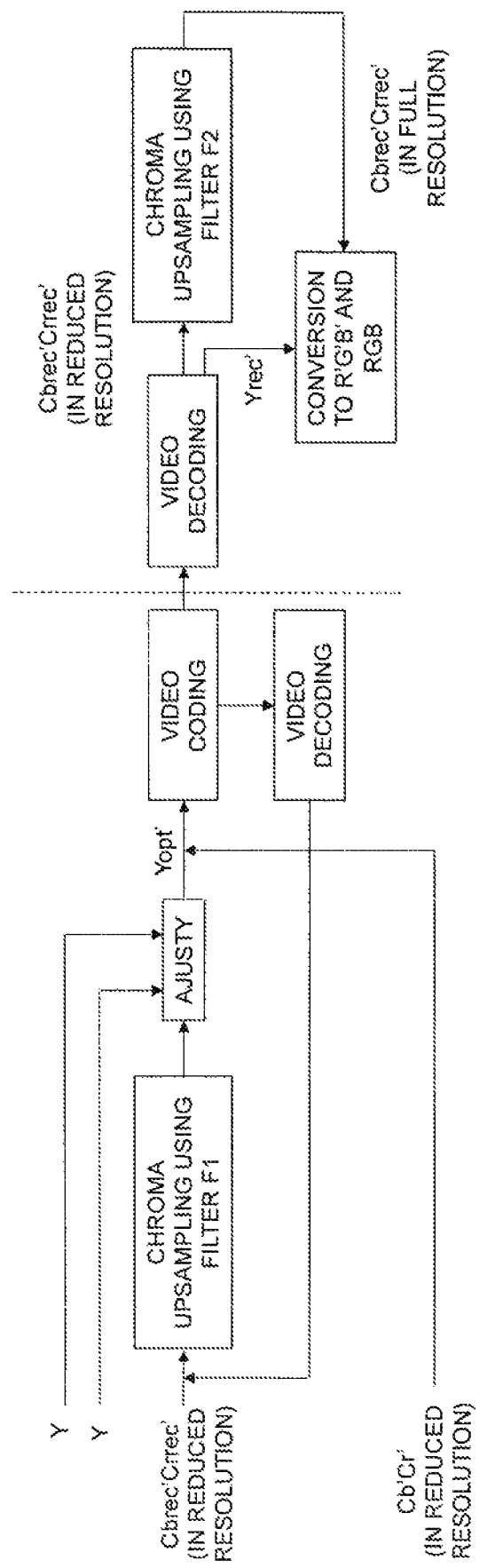
FIG. 10 schematically illustrates an embodiment using different upsampling filters during coding and decoding.

According to another embodiment, other upsampling filters F1 may be used for conversion of at least one sample of a color component during encoding and reconstruction, for example Cbrec'Crrec' from 4:2:0 or 4:2:2 to 4:4:4 for the derivation of the optimal Y', than the upsampling filters F2 used for upsampling Cbrec' Crrec' to full resolution in the processing after decompression but before display. See FIG. 10, in which the encoder consist of all parts before the last video decoding step, i.e. to the left of the vertical hatched line. However, the decoding on the encoder side only need to reconstruct pixel values. The Ajusty method as defined in Annex A uses the reconstructed pixel values for at least one sample of a color component, for example Cbrec'Crrec'. The reason is to reduce complexity for upsampling and/or reduce noise sensitivity when deploying the Ajusty method. Reducing impact of noise can reduce the amount of bits needed to compress Yopt'. Depending on the bitrate that is available for coding it may make sense to apply the Ajusty method somewhat more conservative than what is optimal on a sample by sample basis.

The upsampling filters F1 used for estimation in the Ajusty method can be seen as a combination of pre-filtering of Y' before coding and upsampling of Cb' and Cr'. Thus, as part of the upsampling for estimation in the Ajusty method noise can be removed. One approach to apply the Ajusty method more conservative is to use upsampling filters F1 with more attenuation of higher frequencies. Bi-linear filter is one example of such a filter that both attenuates higher frequencies to a large extent and is simple to compute. However other longer filters can also be of interest to use. This approach can also be used as preprocessing before the video encoder when the Ajusty method is used. In that case all color components are uncompressed.

According to another embodiment, the other embodiments are used to modify the "original" samples to be coded for one color component for at least one sample, one block or one picture of the video. Thus, the coding based on any coding tool can aim for the modified original rather than the unmodified original. Examples of coding tools in video coding are motion compensated sample prediction, intra sample prediction, loop filtering, deblocking filtering, sample adaptive offsets, adaptive loop filtering, adaptive motion compensated sample prediction, etc.

HEVC includes an in-loop deblocking filter intended to reduce the blocking artifacts due to block-based coding. The deblocking filter is applied both for luma and chroma components but only on the pixels or samples located at block boundaries. The filter strength is determined based on the relation of the block types on each side of the boundary, whether any of the blocks have transform coefficients and/or the difference in motion vectors and reference indices. From the filter strength and the average QP, two values tC and beta are determined. Offsets to tC and beta may be signaled at picture level.

In another embodiment, SAO is optimized for a modified version of the luma component, e.g. against Yopt' instead of the original Y', using reconstructed chroma components Cbrec'Crrec'. The embodiment, which here assumes that the input to the encoder is Y'Cb'Cr' 4:2:0 or 4:2:2 and also linear luminance Y from XYZ, could have been derived from Y'Cb'Cr', see later embodiment, or be the "true" original linear luminance, comprises the following steps:

1. Upsample Cbrec'Crecr' to 4:4:4. This is done on the reconstructed pixels, meaning after residuals have possibly been added to an intra/inter prediction and possibly also de-blocking filtering has been applied to derive Y'Cb'Cr' in 4:2:0 or 4:2:2.

2. Derive the optimal Y', a new "original", here denoted Yopt' given Cbrec'Crrec' in 4:4:4 such that the error against Y is minimized, where Y is the correct linear luminance. As part of the optimization to find the Yopt', the currently tested Y' denoted Ycurr' is together with Cbrec'Crrec' in 4:4:4 converted to R'G'B' and then inverse perceptually quantized to derive linear RGB, which then is converted to linear luminance Ycurr. The best Ycurr' is the one that minimizes the difference to Y, i.e. Yopt'. Optionally, Y has been perceptually quantized and inverse quantized before it is used for the optimization.

3. Determine offsets for SAO to minimize the error in reconstructed luma Yrec' and Yopt' such that Yrec'+offset is as close as possible to Yopt'. Select the offsets for either band offset or edge offset, also which direction is best in this case, that minimize the squared error or rate-distortion (RD) cost. The RD cost is calculated as a function of the distortion and the amount of bits spent, where the bits are scaled by a lambda value, a scaling factor that depends on the quantization parameter.

Some bitstream modifications may be envisaged in case the new offset values for SAO are different than the ones used in regular encoding, for example their values or type. In that case, a decoder would also need to be aware of these modifications.

According to another, more general, embodiment for a video encoder, chroma (Cbrec'Crrec') coding is performed first while luma coding is optimized against Yopt' instead of original Y' for applicable video coding tools and/or modes of the video codec. In particular the following steps may be performed depending on the video coding tools:

In Motion Compensated Prediction:
1. The best half-pixel or integer-pixel motion vector could be used for deriving the chroma prediction Cbpred'Crpred'. Then the Yopt' can be derived that minimizes the error compared to the original in linear luminance. As part of the optimization to find the Yopt', the current tested Y' denoted Ycurr' is, together with Cbpred'Crpred' in 4:4:4, converted to R'G'B' and then inverse perceptually quantized to derive linear RGB, which then is converted to linear luminance Ycurr. The best Ycurr' is the one that minimizes the difference to Y, e.g. Yopt'.

2. Find the best motion vector for luma with fractional-pel accuracy with a distortion term that includes the difference between Yopt' and the luma prediction Ypred'. Typically sum of absolute difference (SAD) or sum of squared difference (SSD) is used for the distortion. The RD cost calculation includes an additive cost term with a scaling lambda, dependent on the quantization parameter, and the amount of bits needed to encode the motion vector.

In Intra Prediction:
1. The best chroma modes can first be determined and then the chroma prediction Cbpred'Crpred' is upsampled to 4:4:4 and used to derive the Yopt'.

2. Then the best luma mode is determined used Yopt' as the original, e.g. the best luma mode is the mode that minimizes the distortion term that includes the difference between Yopt' and luma prediction Ypred'.

In Residual Coding:
1. The best chroma transform coefficients are first derived, inverse quantized and inverse transformed and added to the prediction generating reconstructed chroma Cbrec'Crrec'.

2. Yopt' can then be found by upsampling the chroma reconstruction Cbrec'Crrec' to 4:4:4 and testing variants of Y' denoted Ycurr' after converting Ycurr' and the upsampled chroma to R'G'B', applying inverse perceptual quantization to derive linear RGB and then converting RGB to linear luminance, e.g. Y of XYZ. The tested Ycurr' that gives least error compared to the original linear luminance is selected, e.g. Yopt'.

3. Then for luma the residual Yopt'-Ypred', where Ypred' is an intra or inter prediction, is coded instead of the original Y'-Ypred'.

Another technology that has been used for loop filtering during HEVC standardization is Adaptive Loop Filtering (ALF). When ALF is used for a block it filters the pixel values of the block according to specified filter coefficients and offset.

In ALF:
1. Upsample chroma reconstructions Cbrec'Crrec' to 4:4:4 according to step 1 above.

2. Derive Yopt' according to the Ajusty method in step 2 above.

3. Determine the filter coefficients and offsets for ALF such that the error between Yrec' and Yopt' is minimized.

Any steps described herein are merely illustrative of certain embodiments. It is not required that all embodiments incorporate all the steps disclosed nor that the steps be performed in the exact order depicted or described herein.

Furthermore, some embodiments may include steps not illustrated or described herein, including steps inherent to one or more of the steps disclosed herein.

Another aspect of the embodiments relates to a device for encoding a pixel of an input video sequence. The device is configured to encode a second color component value and a third color component value of the pixel in a first color space. The device is also configured to obtain a first color component value in a second color space for the pixel, wherein the second color space is different from the first color space. The device is further configured to determine a first color component value of the pixel in the first color space based on minimizing an error computed based on a difference between the first color component value in the second color space and a test color component value in the second color space. The test color component value is derived based on the encoded second color component value and the encoded third component value. The device is additionally configured to encode the first color component value of the pixel in the first color space.

In an embodiment, the device is configured to determine, for each color component value of the second color component value and the third color component value, an intra or inter prediction of the color component value. The device is also configured to transform, for each color component value of the second color component value and the third color component value, a prediction error calculated as a difference between the color component value and the intra or inter prediction to form transform coefficients. The device is further configured to quantize, for each color component value of the second color component value and the third color component value, the transform coefficients.

In an embodiment, the device is configured to upsample the second color component value and the third color component value in the first color space to obtain an upsampled second color component value and an upsampled third color component value in the first color space. The device is also configured to convert an original first color component value of the pixel in the first color space, and the upsampled second color component value and the upsampled third color component value in the first color space into the first color component value in the second color space.

In an embodiment, the device is configured to decode the encoded second color component value and the encoded third color component value to obtain a reconstructed second color component value and a reconstructed third color component value in the first color space. The device is also configured to upsample the reconstructed second color component value and the reconstructed third color component value to obtain an upsampled reconstructed second color component value and an upsampled reconstructed third color component value in the first color space. The device is further configured to derive the test color component value in the second color space based on a test color component value in the first color space, the upsampled reconstructed second color component value and the upsampled reconstructed third color component value in the first color space.

In an embodiment, the device is configured to select the test color component value in the first color space that minimizes the error computed based on the difference between the first color component value in the second color space and the test color component value in the second color space derived based on a test color component value in the first color space, the encoded second color component value and the third encoded component value.

In an embodiment, the device is configured to determine an intra or inter prediction of the first color component value in the first color space. The device is also configured to transform a prediction error calculated as a difference between the first color component value in the first color space and the intra or inter prediction to form transform coefficients. The device is further configured to quantize the transform coefficients.

In an embodiment, the device is configured to perform obtaining the first color component value and determining the first color component value if the pixel is a pixel of a random access point, RAP, picture of the input video sequence.

In another embodiment, the device is configured to perform obtaining the first color component value and determining the first color component value if the pixel is a pixel of a picture in a lowest layer in the input video sequence having pictures organized in a hierarchical group of pictures, GOP, structure.

In an embodiment, the device is configured to decode the encoded first color component value to obtain a reconstructed first color component value in the first color space. The device is also configured to determine a sample adaptive offset that minimizes 1) a squared error or absolute error between the first color component value in the first color space and a sum of the reconstructed first color component value in the first color space and the sample adaptive offset or 2) a rate-distortion cost calculated as a function of a distortion representing a difference between the first color component value in the first color space and the sum of the reconstructed first color component value in the first color space and the sample adaptive offset and an amount of bits spent for encoding the sample adaptive offset.

Another aspect of certain embodiments defines an encoder. The encoder comprising, in this embodiment, processing means and a memory comprising instructions which, when executed by the processing means, cause the encoder to obtain at least one sample of the input video sequence in a second color space, wherein the second color space is different than the first color space. The encoder is also caused to encode at least one sample of one or two first color components of the input video sequence in the first color space. The encoder is further caused to modify at least one sample of a second color component of the input video sequence based on minimizing the error computed as the difference between at least one sample of the input video sequence in the second color space and a derived test sample in the second color space where the derivation of the test sample includes at least one encoded sample for one or two first color components in the first color space. The encoder is additionally caused to encode at least one modified sample of the second color component of the input video sequence.

The encoder could also comprise obtaining means configured to obtain at least one sample of the input video sequence in a second color space, wherein the second color space is different than the first color space. The encoder could further comprise encoding means configured to encoding at least one sample of one or two first color components of the input video sequence in the first color space. The encoder may also comprise modifying means configured to modify at least one sample of a second color component of the input video sequence based on minimizing the error computed as the difference between at least one sample of the input video sequence in the second color space and a derived test sample in the second color space where the derivation of the test sample includes at least one encoded sample for one or two first color components in the first color space. The encoding means is further configured to encode at least one modified sample of the second color component of the input video sequence.

The encoder may be implemented in hardware, in software or a combination of hardware and software. The encoder may be implemented in, e.g. comprised in, user equipment, such as a mobile telephone, such as smart phone, tablet, desktop, netbook, multimedia player, video streaming server, set-top box or computer.

The embodiments are generic and can be applied to any encoder for determining coding modes in a video encoder. It could also be basis for optimization of a new coding tool or adaptation of an existing coding tool to better enable this. Certain embodiments of the present invention may be applied to other color spaces such as XYZ, xyz, Yxy, etc., as well as other subsample formats, e.g. 4:2:2, that only subsample in horizontal or vertical direction.

Figure 12:
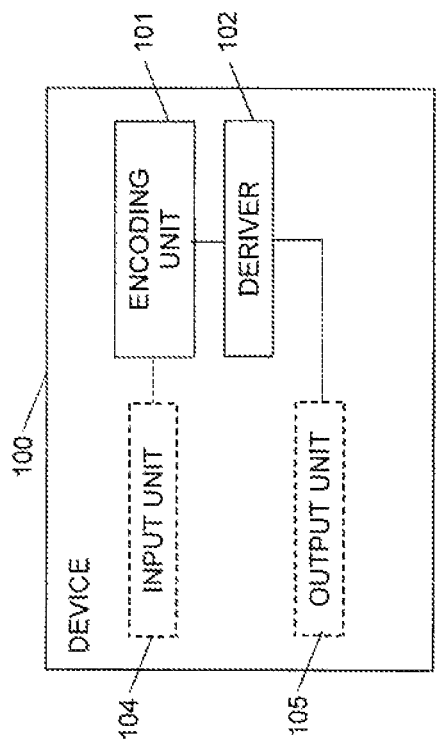
FIG. 12 is a schematic illustration of a hardware implementation of a device according to the embodiments.

FIG. 12 illustrates a particular hardware implementation of a device 100 according to the embodiments. In an embodiment, the device 100 comprises an input unit 104 configured to obtain at least one sample of the input video sequence in a second color space, wherein the second color space is different than the first color space.

The device 100 also comprises an encoding unit 101 configured to encode at least one sample of one or two first color components of the input video sequence in the first color space. The device 100 also comprises a deriver 102 configured to modify at least one sample of a second color component of the input video sequence based on minimizing the error computed as the difference between at least one sample of the input video sequence in the second color space and a derived test sample in the second color space where the derivation of the test sample includes at least one encoded sample for one or two first color components in the first color space. The encoding unit 101 is further configured to encode at least one modified sample of the second color component of the input video sequence.

The device 100 may also comprise an output unit 105 configured to output an encoded bitstream.

The input unit 104 could be in the form of a general input unit, in particular in the case of a wired connection to external devices. Alternatively, the input unit 104 could be in the form of a receiver or transceiver, in particular in the case or a wireless connection to external devices. Correspondingly, the output unit 105 could be in the form of a general output unit, in particular in the case of a wired connection to external devices. Alternatively, the output unit 105 could be in the form of a transmitter or transceiver, in particular in the case or a wireless connection to external devices.

The input unit 104 is preferably connected to the encoding unit 101 to forward the video to be encoded thereto. The encoding unit 101 is preferably connected to the deriver 102 The deriver 102 is preferably connected to the output unit 105 to forward the encoded bitstream to a decoder.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 13:
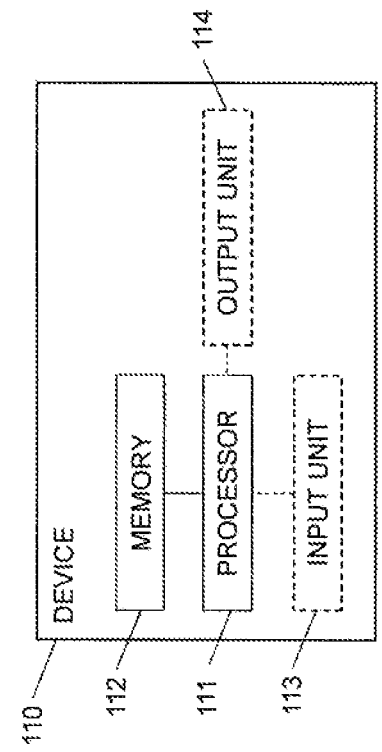
FIG. 13 is a schematic illustration of an implementation of a device according to the embodiments with a processor and a memory.

In a particular embodiment, the device 110, see FIG. 13, comprises a processor 111 and a memory 112 comprising instructions executable by the processor 111. The processor 111 is operative to obtain at least one sample of the input video sequence in a second color space, wherein the second color space is different than the first color space. The processor 111 is also operative to encode at least one sample of one or two first color components of the input video sequence in the first color space. The processor 111 is further operative to modify at least one sample of a second color component of the input video sequence based on minimizing the error computed as the difference between at least one sample of the input video sequence in the second color space and a derived test sample in the second color space where the derivation of the test sample includes at least one encoded sample for one or two first color components in the first color space. The processor 111 is additionally operative to encode at least one modified sample of the second color component of the input video sequence.

In another particular embodiment, the device 110 shown in FIG. 13 comprises a processor 111 and a memory 112 comprising instructions executable by the processor 111. The processor 111 is then operative to encode the second color component value and the first color component value in the first color space. The processor 111 is also operative to obtain the first color component value in the second color space. The processor 111 is further operative to determine the first color component value in the first color space. The processor 111 is additionally operative to encode the first color component value of the pixel in the first color space.

In an embodiment, the device 110 also comprises an input unit 113 configured to receive the video to be encoded. In such a case, the processor 111 is operative to receive the video to be encoded from the input unit 113.

In an embodiment, the device 110 also comprises an output unit 114 configured to output encoded bitstream as received from the processor 111.

In a particular embodiment, the processor 111 is operative, when executing the instructions stored in the memory 112 to perform the above described operations. The processor 111 is thereby interconnected to the memory 112 to enable normal software execution.

The components of FIG. 13 are depicted as single boxes located within a single larger box. In practice however, the device 110 may comprise multiple different physical components that make up a single illustrated component, e.g. the input unit 113 may comprise terminals for coupling wires for a wired connection and a radio transceiver for a wireless connection. Similarly, the device 110 may be composed of multiple physically separate components which may each have their own respective processor, memory, and interface components. In certain scenarios in which the device 110 comprises multiple separate components, one or more of the separate components may be shared among several devices. For example, a single memory unit may be shared by multiple devices 110.

The processor 111 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other device components, such as the memory 112, or device functionality. For example, the processor 111 may execute instructions stored in the memory 112. Such functionality may include providing various encoding or decoding features and/or any of the other features or benefits disclosed herein.

The memory 112 may comprise any form of volatile or non-volatile computer readable memory including, without limitation, persistent memory, solid state memory, remotely mounted memory, magnetic media, optical media, random access memory (RAM), read-only memory (ROM), removable media, or any other suitable local or remote memory component. The memory 112 may store any suitable instructions, data or information, including software and encoded logic, utilized by the device 110. The memory 112 may be used to store any calculations made by the processor 111 and/or any data received via the I/O interfaces, including the input unit 113.

The device 110 also comprises an input unit 113 and an output unit 114, i.e. I/O interfaces, which may be used in the wired or wireless communication of video and/or data to and from the device 110. The I/O interfaces may include a radio transmitter and/or receiver that may be coupled to or a part of an antenna. The I/O interfaces may receive video that is to be encoded or decoded.

Any appropriate steps, methods, or functions may be performed through a computer program product that may, for example, be executed by the components and equipment illustrated in the attached figures. For example, the memory 112 may comprise computer readable means on which a computer program can be stored. The computer program may include instructions which cause the processor 111, and any operatively coupled entities and devices, such as the input unit 113, the output unit 114, and the memory 112, to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by the processor 111, possibly in cooperation with the memory 112. The processor 111 and the memory 112 may, thus, be arranged to allow the processor 111 to fetch instructions from the memory 112 and execute the fetched instructions to allow the respective functional module to perform any steps or functions disclosed herein.

Figure 14:
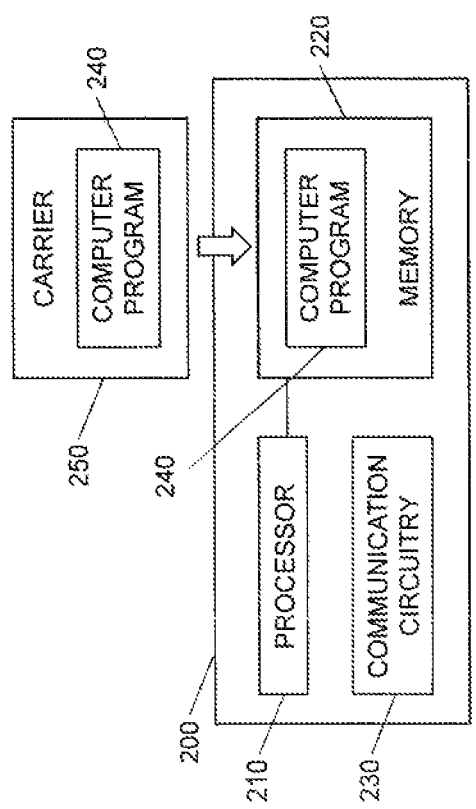
FIG. 14 is a schematic illustration of a user equipment according to an embodiment.

FIG. 14 is a schematic block diagram illustrating an example of a user equipment (UE) 200 comprising a processor 210, an associated memory 220 and a communication circuitry 230.

In this particular example, at least some of the steps, functions, procedures, modules and/or blocks described herein are implemented in a computer program 240, which is loaded into the memory 220 for execution by processing circuitry including one or more processors 210. The processor 210 and the memory 220 are interconnected to each other to enable normal software execution. A communication circuitry 230 is also interconnected to the processor 210 and/or the memory 220 to enable input and/or output of video data and tune-in or seek requests.

The user equipment 200 can be any device or apparatus that can receive and process video data. For instance, the user equipment 200 could be a computer, either stationary or portable, such as laptop, a smart phone, a tablet, a set-top box, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by the processor 210, cause the processor 210 to obtain at least one sample of the input video sequence in a second color space, wherein the second color space is different than the first color space. The processor 210 is also caused to encode at least one sample of one or two first color components of the input video sequence in the first color space. The processor 210 is further caused to modify at least one sample of a second color component of the input video sequence based on minimizing the error computed as the difference between at least one sample of the input video sequence in the second color space and a derived test sample in the second color space where the derivation of the test sample includes at least one encoded sample for one or two first color components in the first color space. The processor 210 is additionally caused to encode at least one modified sample of the second color component of the input video sequence.

In a particular embodiment, the computer program 240 comprises comprising instructions, which when executed by a processor 210, cause the processor 210 to encode a second color component value and a third color component value, of a pixel of an input video sequence, in a first color space. The processor 210 is also caused to obtain a first color component value in a second color space for the pixel, wherein the second color space is different from the first color space. The processor 210 is further caused to determine a first color component value of the pixel in the first color space based on minimizing an error computed based on a difference between the first color component value in the second color space and a test color component value in the second color space. The test color component value is derived based on the encoded second color component value and the encoded third component value. The processor 210 is additionally caused to encode the first color component value of the pixel in the first color space.

In another particular embodiment, a computer program 240 for an encoder comprises a computer program code which, when executed, causes the encoder to obtain at least one sample of the input video sequence in a second color space, wherein the second color space is different than the first color space. The encoder is also caused to encode at least one sample of one or two first color components of the input video sequence in the first color space. The encoder is further caused to modify at least one sample of a second color component of the input video sequence based on minimizing the error computed as the difference between at least one sample of the input video sequence in the second color space and a derived test sample in the second color space where the derivation of the test sample includes at least one encoded sample for one or two first color components in the first color space. The encoder is additionally caused to encode at least one modified sample of the second color component of the input video sequence.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium 250.

By way of example, the software or computer program 240 may be realized as a computer program product, which is normally carried or stored on a computer-readable medium 240, preferably non-volatile computer-readable storage medium 250. The computer-readable medium 250 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 240 may thus be loaded into the operating memory of a computer or equivalent processing device, represented by the user equipment 200 in FIG. 14, for execution by the processor 210 thereof.

A further aspect of certain embodiments defines a computer program product for an encoder comprising a computer program 240 for an encoder and a computer readable means 250 on which the computer program 240 for an encoder is stored.

The flow diagram or diagrams presented herein may therefore be regarded as a computer flow diagram or diagrams, when performed by one or more processors. A corresponding device may be defined as a group of function modules, where each step performed by the processor corresponds to a function module. In this case, the function modules are implemented as a computer program running on the processor. Hence, the device may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 15.

Figure 15:
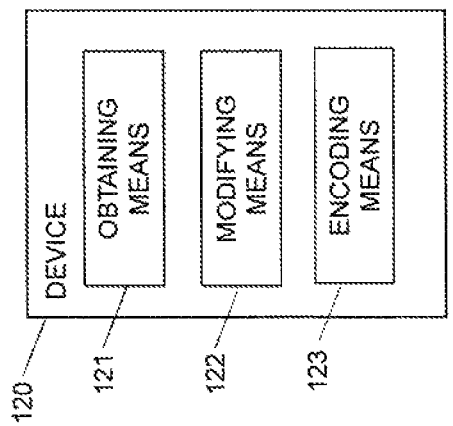
FIG. 15 is a schematic illustration of an implementation of a device according to the embodiments with function modules.

FIG. 15 is a schematic block diagram of a device 120 with function modules. The device 120 comprises an obtaining unit for obtaining/obtaining means 121 configured to obtain at least one sample of the input video sequence in a second color space, wherein the second color space is different than the first color space The device 120 also comprises an encoding unit for encoding/encoding means 123 configured to encode at least one sample of one or two first color components of the input video sequence in the first color space. The device 120 further comprises a modifying unit for modifying/modifying means 122 configured to modify at least one sample of a second color component of the input video sequence based on minimizing the error computed as the difference between at least one sample of the input video sequence in the second color space and a derived test sample in the second color space where the derivation of the test sample includes at least one encoded sample for one or two first color components in the first color space. The encoding unit is further for encoding/the encoding means 123 is further configured to encode at least one modified sample of the second color component of the input video sequence.

In an embodiment, the device 120 for encoding a pixel of an input video sequence in FIG. 15 comprises encoding means 123 for encoding a second color component value and a third color component value of the pixel in a first color space. The device 120 also comprises obtaining means 121 for obtaining a first color component value in a second color space for the pixel, wherein the second color space is different from the first color space. The device 120 further comprises modifying means 122 for determining a first color component value of the pixel in the first color space based on minimizing an error computed based on a difference between the first color component value in the second color space and a test color component value in the second color space. The test color component value is derived based on the encoded second color component value and the encoded third component value. The encoding means 123 is also for encoding the first color component value of the pixel in the first color space.

A further aspect of the embodiments relates to a user equipment comprising a device according to the embodiments, such as illustrated in any of FIG. 12, 13 or 15. The user equipment is selected from a group consisting of a computer, a laptop, a desktop, a multimedia player, a video streaming server, a mobile telephone, a smart phone, a tablet and a set-top box.

Yet another aspect of the embodiments relates to a signal representing an encoded version of a pixel of an input video sequence picture. The encoded version comprises a first color component value, a second color component value and a third color component value in a first color space encoded according to any of the embodiments. In an embodiment, the signal is one of an electronic signal, an optical signal, an electromagnetic signal, a magnetic signal, an electric signal, a radio signal and a microwave signal.

It is becoming increasingly popular to provide computing services, such as hardware and/or software, in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

FIG. 16 is a schematic diagram illustrating an example of how functionality can be distributed or partitioned between different network devices 300, 301, 302 in a general case. In this example, there are at least two individual, but interconnected network devices 300, 301, which may have different functionalities, or parts of the same functionality, partitioned between the network devices 300, 301. There may be additional network devices 302 being part of such a distributed implementation. The network devices 300, 301, 302 may be part of the same wireless communication system, or one or more of the network devices may be so-called cloud-based network devices located outside of the wireless communication system.

FIG. 17 is a schematic diagram illustrating an example of a wireless communication system, including an access network 1 and/or a core network 2 and/or an Operations and Support System (OSS) 3 in cooperation with one or more cloud-based network devices 300. The figure also illustrates a network node 4 of the access network 1 and a user equipment 5 according to the embodiments.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and encoder or decoder systems and any feature from a particular figure disclosed in connection with other features may be applicable to any other figure and or combined with different features.

ANNEX A

The present Annex A comprises a description of the Ajusty method that can be used according to the embodiments in order to derive a non-linear luma component value in the second color space.

A combination of a highly non-linear transfer function, 4:2:0 or 4:2:2 subsampling and non-constant luminance ordering gives rise to severe artifacts in saturated colors. An example is described in Annex B, where changes between two colors of similar luminance can result in a reconstructed image with very different luminances.

In a digital video signal, each component of a sample, i.e. pixel, is represented by an integer or floating point value. A display, such as screen, TV or monitor, that renders the video omits optical lights based on the digital values of the video signal. The function that translates the digital value V to optical light Y is the Electro-Optical-Transfer-Function (EOTF). Traditionally the EOTF has been expressed as an exponential function called a gamma function where the gamma γ is the exponent value. This is typically 2.4 (but can also be other values): $Y=V^\gamma$.

Using a gamma function works well for low luminance signals but when the luminance goes above 100 nits (cd/m²) the gamma function is not well aligned with the contrast sensitivity of the human visual system. Therefore transfer functions that are more non-linear are defined, e.g.:

$$Y = L_p \left( \frac{\max[(V^{1/m} - c_1), 0]}{c_2 - c_3 V^{1/m}} \right)^{1/n} \quad \text{(equation A1)}$$

$$n = \frac{2610}{4096} \times \frac{1}{4} \approx 0.15930176$$

$$m = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

$$L_p = 10000 \frac{cd}{m^2}$$

This transfer function is more non-linear than the gamma function in the sense that the maximum value of its first derivative over the range from 0 to 1 is larger than that of the gamma function.

Chroma subsampling is typically done before compression as an initial step to reduce the amount of data. In 4:2:2 the chroma signal is reduced to half the resolution in the vertical direction. In 4:2:0 the chroma signal is reduced to half the resolution in both the vertical direction and the horizontal direction. This is typically done with some filtering operation to get a good quality signal but can also be done using nearest neighbor.

In order to display a 4:2:0 or 4:2:2 video, a decoder performs upsampling of the chroma signal, which can be done using bilinear filters or longer filters.

However, a combination of a highly non-linear transfer function, 4:2:0 or 4:2:2 subsampling and non-constant luminance ordering gives rise to severe artifacts to the video data, in particular for saturated colors, i.e. colors close to the color gamut edge.

There are several ways to get around this problem. One ways is to not use 4:2:0 or 4:2:2 subsampling, but use 4:4:4 instead. That, however, is expensive, since 4:2:0 halves the number of bits prior to compression, whereas 4:2:2 reduces the number of bits to two-thirds. Another way is to not use a highly non-linear transfer function. However, that means that it is hard to represent content of very high peak brightness without having banding in dark regions. A third way is to use constant luminance, i.e. apply the transfer function after conversion to the CIE1931 XYZ color space. However, such a solution is not aligned with common practice within the broadcasting industry and might in some scenarios be difficult and expensive to realize.

A typical compression chain is described below. The incoming linear light pixel (R, G, B) ranging from 0 to 10,000 is first fed to the transfer function, which results in a new pixel (R', G', B') between 0 and 1. After this, the pixel undergoes color transform resulting in Y'Cb'Cr'. Then the Cb' and Cr' components are subsampled to 4:2:0.

After decompression, the 4:2:0 sequences are upsampled to 4:4:4 again, inverse color space conversion gives (R', G', B') and finally inverse transfer function gives back the linear light pixel (R, G, B) that can be output on a monitor.

The trouble comes from the fact that the Cb' and Cr' components are interpolated, whereas the Y' component is not. Hence there can be a sharp shift in the Y' component in a pixel, but the Cb' and Cr' component cannot follow, since they are interpolated. For some colors, especially saturated colors, the result is a pixel of completely wrong intensity, and it is clearly visible.

It is proposed to change the Y' component in these cases so that the tuple (Y' Cb' Cr') generated from the interpolated colors is not so different from the original. Ideally the difference would be so small that it is not noticeable.

Basically it emanates to realizing that the Cb' and Cr' components are false, and then make also the Y' component false so that the (Y' Cb' Cr') are closer to the true colors. In other words, by introducing an error in Y' we can compensate for the errors already existing in Cb' and Cr' to come closer to the real pixel. It could be determined that the Cb' and Cr' components are false by comparing Cb'-Cb and Cr-Cr with a threshold by e.g. comparing the Cb' that you get from first subsampling chroma (4:2:0) then upsampling (to 4:4:4).

According to a first aspect an Ajusty method is provided. The method can be performed in an encoder or in a pre-process to the encoder. In the method, when it is determined that the Cb' and/or Cr' components include errors, a corrected Y' component is derived to compensate for the errors in the Cb' and/or the Cr' components.

According to a second aspect a unit, such as a pre-processor or an encoder, is provided. The unit is configured to determine that the Cb' and/or Cr' components include errors, and when it has determined that the Cb' and/or Cr' components include errors, it is configured to derive a corrected Y' component to compensate for the errors in the Cb' and the Cr' components.

The corrected Y' component can derived according to different embodiments as described below. Hence the corrected Y' component, Cb' and Cr' are then compressed resulting in that the image or video is perceived with a higher quality.

By changing the Y' component, i.e. deriving a corrected Y' component, we can compensate the resulting luminance value. The eye is much more sensitive to luminance changes than to chrominance changes, so the first rule must always be to make sure that the luminance does not deviate too much from the original value.

As described above, the non-linear luminance Y' is adjusted prior to compression so that the linear luminance Y of the pixel is closer to its correct value. This is further described below.

Assume a picture where the left part of the screen, e.g. pixels 0 to 96, has the value (2142, 0, 138) and that the right part, e.g. pixels 97 to 1920, has the value (2142, 4, 138). With a conventional processing chain we would get the results in Table A1.

TABLE A1

Data for the "worst" color for 4:2:0 subsampling

| Pixel no. 97 | RGB value | Y value | Y diff | relative error | Barten steps |
|---|---|---|---|---|---|
| original | 2142<br>4<br>138 | 573.5991 | 0 | 0 | 0 |
| RGB 4:4:4 | 2142.6617<br>3.9750<br>138.2966 | 573.7735 | 0.1745 | 0.0304% | 0.0691 |

TABLE A1-continued

Data for the "worst" color for 4:2:0 subsampling

| Pixel no. 97 | RGB value | Y value | Y diff | relative error | Barten steps |
|---|---|---|---|---|---|
| RGB 4:2:0* | 3993.733<br>2.4265<br>263.6030 | 1066.4311 | 492.8320 | 85.9192% | 195.2710 |

*This indicates values obtained by upsampling the subsampled color in 4:2:0 format Here, the Y value is the linear luminance. That is, the Y value of the original is the value you get when you take the original linear light RGB (2142, 4, 138) and convert it to XYZ. For example, if RGB is in the BT.2020 color space you can convert to XYZ using $$X = 0.636958 \times R + 0.144617 \times G + 0.168881 \times B$$

$$Y = 0.262700 \times R + 0.677998 \times G + 0.059302 \times B$$

$$Z = 0.000000 \times R + 0.028073 \times G + 1.060985 \times B \quad \text{(equation A2)}$$

This Y component is the luminance that the eye is most sensitive to. It should not be confused with the Y' component mentioned above, which depends nonlinearly on R, G and B.

As can be seen in Table A1, the Y value is grossly wrong for pixel 97 when using RGB 4:2:0 subsampling and upsampling. Note that in this example, no compression has taken place, only quantization to 10 bits, and yet the Y value has a relative error of 85%. Using Barten's model that predicts how large differences the eye can see, we see that this error is 195 Barten steps, or 195 times greater than what would be just noticeable.

If we look at Table A2, we can see what happens.

TABLE A2

Pixel 97 is very different before and after color subsampling

| 4:4:4<br>10 bits | 94 | 95 | 96 | 97 | 98 | 99 |
|---|---|---|---|---|---|---|
| Linear RGB in | 2142<br>0<br>138 | 2142<br>0<br>138 | 2142<br>0<br>138 | 2142<br>4<br>138 | 2142<br>4<br>138 | 2142<br>4<br>138 |
| Y'Cb'Cr'<br>4:2:0<br>10 bits | 284<br>650<br>867 | 284 | 284<br>641<br>855 | 422 | 422<br>575<br>771 | 422 |
| Y'Cb'Cr'<br>after<br>upsampling | 284<br>650<br>867 | 284<br>650<br>866 | 284<br>641<br>855 | 422<br>607<br>812 | 422<br>575<br>771 | 422<br>571<br>766 |
| Linear RGB out | 2151.71<br>0<br>138.2278 | 2119.42<br>0<br>138.2278 | 1794.94<br>0.0018<br>114.8210 | 3993.73<br>2.4265<br>263.6030 | 2142.66<br>3.9750<br>138.2966 | 1986.71<br>4.2102<br>127.3837 |

If we look at the Cb' component, it has the value 607, which is about halfway between 650, before the discontinuity, i.e. pixel 94, and 575, after the discontinuity, but the correct value is 575. The trouble is that the error not only affects the chrominance but also the luminance of the pixel, which becomes way too big. Our idea is to compensate this by changing the Y' component of the pixel. According to the embodiments we do not let the Y' component be 422 for the pixel, but selects the value 363 instead. In Table A3 we show the result.

TABLE A3

Pixel 97 is much more similar before and after color subsampling

| 4:4:4 10 bits | 94 | 95 | 96 | 97 | 98 | 99 |
|---|---|---|---|---|---|---|
| Linear RGB in | 2142 0 138 | 2142 0 138 | 2142 0 138 | 2142 4 138 | 2142 4 138 | 2142 4 138 |
| Y'Cb'Cr' 4:2:0 10 bits | 284 650 867 | 284 | 284 641 855 | 363 | 422 575 771 | 422 |
| Y'Cb'Cr' after upsampling | 284 650 867 | 284 650 866 | 284 641 855 | 363 607 812 | 422 575 771 | 422 571 766 |
| Linear RGB out | 2151.71 0 138.2278 | 2119.42 0 138.2278 | 1794.94 0.0018 114.8210 | 2145.11 0.7008 138.0825 | 2142.66 3.9750 138.2966 | 1986.71 4.2102 127.3837 |

We can now see that the new color is much more similar to its correct value. The green component has gone in the wrong direction, but only by 1.72 cd/m², but at the same time the red component has almost halved to its correct value, a movement of 1849 cd/m², and the blue component has changed in a similar fashion. In Table A4 we show what happens to the luminance.

TABLE A4

Data for the "worst" color for 4:2:0 subsampling after correction

| Pixel no. 97 | RGB value | Y value | Y diff | relative error | Barten steps |
|---|---|---|---|---|---|
| original | 212 4 138 | 573.5991 | 0 | 0 | 0 |
| RGB 4:4:4 | 2142.6617 3.9750 138.2966 | 573.7735 | 0.1745 | 0.0304% | 0.0691 |
| RGB 4:2:0* | 2145.11 0.7008 138.0825 | 572.1852 | 1.4139 | 0.2465% | 0.5602 |

*This indicates values obtained by upsampling the subsampled color in 4:2:0 format As is seen in Table A4, we get a much smaller error in the luminance Y. The relative error is 0.2465%, which is equivalent to 0.5602 Barten steps, i.e. not possible to see.

The error is now instead in the chrominance, but given the fact that the human visual system is less sensitive to errors in chrominance than in luminance, this is not much of a problem. In addition, there is going to be an error in chrominance anyway since it is subsampled. Also, one may change the Y' component to get a good trade-off between the error in luminance and the error in chrominance.

Furthermore, the change in chrominance may not even be noticeable—the only difference is that the green component is 0.7008 cd/m² instead of 3.9750 cd/m² but that is most likely dwarfed by the red component anyway, since it is 2145, almost a thousand times larger. Another way to see it is that the ratio between the green and the red components becomes 0.7008/2145.11=0.000327 instead of the correct 3.9750/2142.6617=0.001855. It is not clear that this slight shift in hue is possible to see for the human eye. Hence we have traded an error in luminance that is 200 times larger than what is just noticeable to an error in chrominance that is so small it might not be possible to see.

The nice thing is that the changed Y' value only affects the individual pixel. Hence no other pixel is sacrificed by changing the Y' component.

In an embodiment, the value Y' is not optimized for a specific value of Cb' and Cr'. Instead the Y' value is selected so that it minimizes the luminance error for some different values of Cb' and Cr' or for a range of Cb' and Cr' values. This can be done in scenarios where the chroma upsampling method is unknown.

One variant is to perform a specific number of chroma upsampling methods and then select the Y' value that minimizes the average squared error for the different upsampling methods. In another version, the Y' value is selected so that the worst case, i.e. largest error, is minimized.

Another variant is to use two or more neighboring values of Cb' and Cr' and use them directly to calculate the range of possible Cb' and Cr' values.

Figure 18:
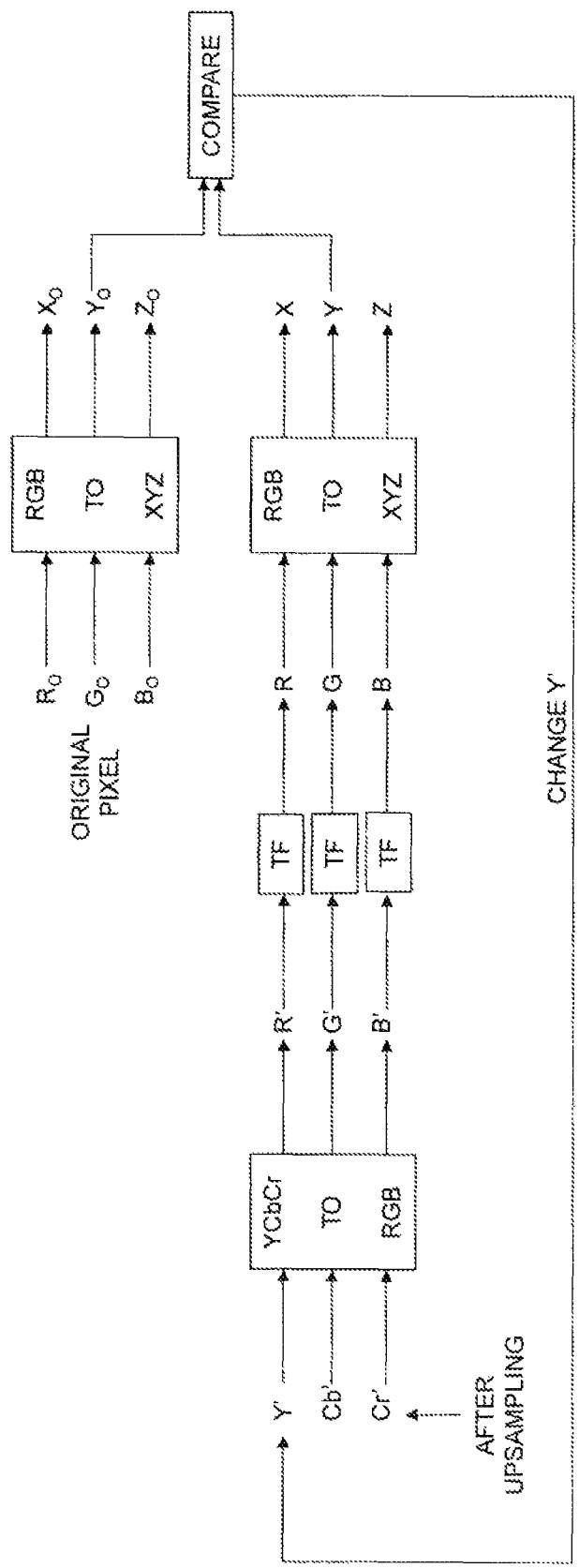
FIG. 18 illustrates an embodiment of deriving the corrected Y'.

There are several ways to find the best value for Y', we will go through a number of them. One way is shown in FIG. 18.

First we need to find the value $Y_O$ to optimize towards. The original pixel $R_o$, $G_o$, $B_o$ is transformed from RGB to XYZ as mentioned above. This results in $X_o$, $Y_o$, $Z_o$, of which we are only interested in $Y_o$. In fact, we do not need to calculate $X_o$ and $Z_o$. This $Y_o$ is the original luminance in linear light, and it is this that the eye is sensitive to. In our test case $Y_o$ is equal to 573.5991, see Table A1.

Second, we take our existing Y' value, together with the Cb' and Cr' values. In the case above, we would feed in (422, 607, 812), see Table 2. Now we would do a color transform from Y'Cb'Cr' to R'G'B'. This is done using $$R' = Y' + 1.47460 \times Cr'$$

$$G' = Y' - 0.16455 \times Cb' - 0.57135 \times Cr'$$

$$B' = Y' + 1.88140 \times Cb'. \quad \text{(equation A3)}$$

Next we invoke the transfer function. In this case we use the PQ-EOTF, which can be implemented using the following Matlab code, for instance:
function L=pq_eotf(c)
%%%
%%% c goes from 0.0 to 1.0
%%% L is output luminance in nits
%%%
c1=0.8359375;
c2=18.8515625;
c3=18.6875;
n=0.1593017578125;
m=78.84375;

c=max(c,0);
c=min(c,1);
L=10000*((max(c.^(1/m)−c1, 0)./(c2−c3*c.^(1/m))).^(1/n));

The result is the color (R, G, B) in linear light. Now we convert this to XYZ as mentioned above, or really, we only need to calculate Y. This Y is the linear luminance of the pixel, and it is this luminance that we want to make as close as possible to $Y_o$. In our test case, Y starts out being 1066.4311, see Table A1.

Now we compare Y and $Y_o$. If Y is bigger than $Y_o$, we reduce our Y' value from 422 to something smaller. For instance, we can take one step and try 421. Then the entire calculation is carried out again, generating a new Y value. This is again compared to $Y_o$, and if it is still too big, we reduce Y' further. Finally, we will reach 363 and the resulting Y value, i.e. 572.1852 is now smaller than $Y_o$, i.e. 573.5991. The process now stops.

In the embodiment above it takes 422−363=59 iterations to reach the best value. This may be costly.

Therefore, an embodiment is to do a binary search to find the best Y' value. Optionally, first the maximum Y' value is tried, for instance 1023. Optionally, then the minimum Y' value is tried, for instance 0. Then a value in the middle is tried, for instance 512. If the Y value resulting from Y'=512 is larger than $Y_o$, we should search in the interval [0, 512]. If the Y-value is smaller than $Y_O$, we should instead search the interval [512, 1023]. We then proceed by calculating a new value in the middle of the selected interval, and proceeds until the interval only contains a single number, such as [363, 363], or [363, 364]. This is guaranteed to only take $\log_2(N)$ steps, where N is the number of possible values, which in this case is 1024. Hence only $\log_2(1024)$=10 steps are sufficient.

Yet another way to calculate the best value is to see FIG. 18 as an optimization problem and minimize the error $E=(Y-Y_o)^2$ with respect to Y'. This can be done by gradient descent, by calculating the gradient of E with respect to Y', i.e. dE/dY', and update Y' a small amount in the opposite direction of the gradient: $Y'_{n+1}=Y'_n-\alpha \times dE/dY'$, where α is a small constant.

Gradient descent can be slow, so a quicker way may be to use a second-order optimization algorithm that calculates or approximates the second order derivatives $d^2E/dY'^2$. Gauss-Newton is an example of such an algorithm.

In another embodiment the following process is applied in order to calculate Y':
X, $Y_o$ and Z are converted with a XYZ to RGB conversion to produce new values R1, G1 and B1
R1, G1 and B1 are converted with an inverse transfer function to produce R1', G1' and B1'.
R1', G1' and B1' are converted with an inverse color transform to produce Y'

In an embodiment, the Y' values of all pixels in an image or picture are corrected. In an alternate embodiment, only pixels that are at risk of having visible luminance errors are corrected. This may include pixels that are close to the color gamut edge, but exclude pixels closer to the middle of the color gamut triangle.

Looking at the bottom row in FIG. 18, the first step of processing is $$R'=Y'+1.47460 \times Cr'$$

$$G'=Y'-0.16455 \times Cb'-0.57135 \times Cr'$$

$$B'=Y'+1.88140 \times Cb'. \qquad \text{(equation A3)}$$

But since Cr' and Cb' are fixed, they are interpolated, not sent, we can replace everything to the right of Y' with a constant $$R'=Y'+c1$$

$$G'=Y'+c2$$

$$B'=Y'+c3$$

The next step is taking the transfer function of the color components:

$$R=TF(R')$$

$$G=TF(G')$$

$$B=TF(B')$$

which then becomes $$R=TF(Y'+c1)$$

$$G=TF(Y'+c2)$$

$$B=TF(Y'+c3)$$

The last step of the processing is going from RGB to XYZ. This is done using $$X=0.636958 \times R+0.144617 \times G+0.168881 \times B$$

$$Y=0.262700 \times R+0.677998 \times G+0.059302 \times B$$

$$Z=0.000000 \times R+0.028073 \times G+1.060985 \times B \qquad \text{(equation A2)}$$

of this we are only interested in the Y component, so we use $$Y=0.262700 \times R+0.677998 \times G+0.059302 \times B.$$

Inserting the previous equations into this gives $$Y=0.262700 \times TF(Y'+c1)+0.677998 \times TF(Y'+c2)+0.059302 \times TF(Y'+c3),$$

or shortened to $$Y=f(Y')$$

We want the output value Y of this equation to match the original $Y_O$. Since the Y depends on Y' in three different places in a nonlinear way, there seems to be no easy way to invert the function so that we can get $Y'=f^{-1}(Y)$.

However, it is possible to linearize the nonlinear TF(x) ~kx+m. Doing this in the three different places gives $$Y \sim k1 \times Y'+m1+k2 \times Y'+m2+k3 \times Y'+m3$$

which is equivalent to $$Y \sim (k1+k2+k3) \times Y'+(m1+m2+m3).$$

This can be inverted to $$Y'\sim Y'k=(Y_o-(m1+m2+m3))/(k1+k2+k3). \qquad \text{(A4)}$$

Thus it is likely that Y'k will produce a value Y'k closer to $Y_o$ than before. The function can be linearized again at this new point Y'k, resulting in a new value Y'k+1, etc.

It should be noted that for all these iterative techniques it is not necessary to find the absolutely best 10 bit value that generates the Y value closest to the $Y_O$ value. It may be sufficient to just use a few iterations or even one iteration. The corrected Y value resulting from a single iteration will most likely be much better than not correcting at all.

Figure 19:
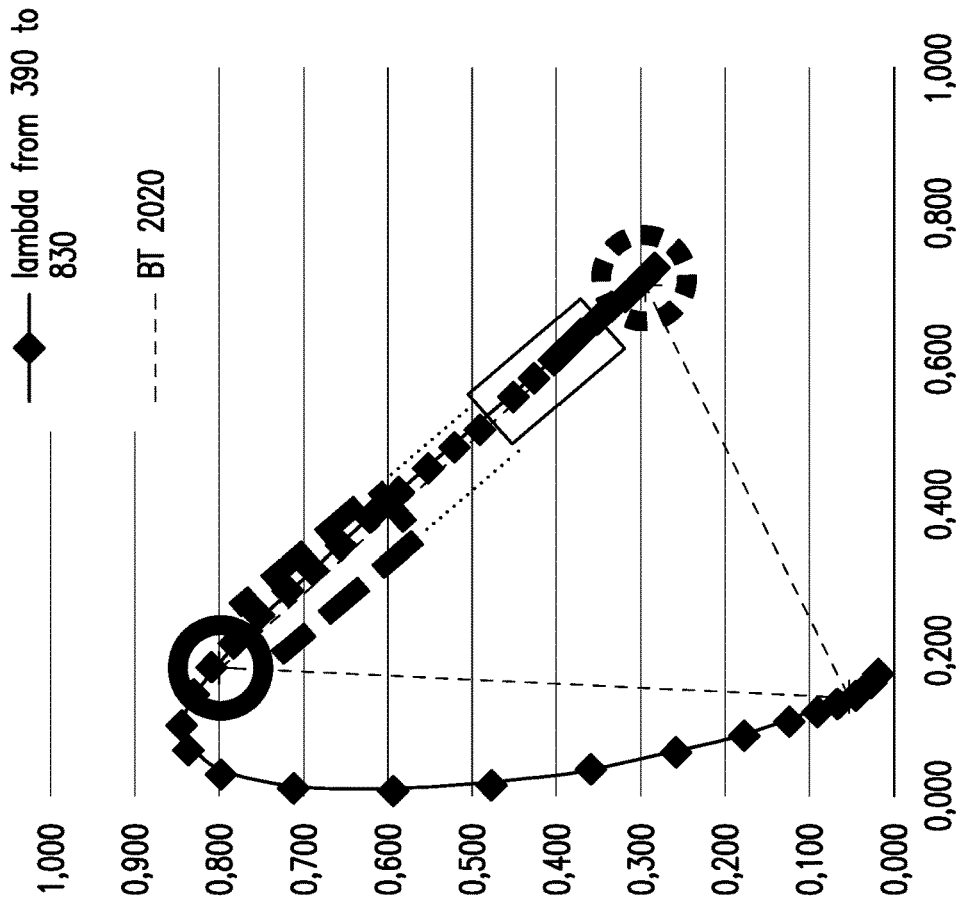
FIG. 19 is a diagram illustrating that there can be different linearizations in different color areas.

Some linearizations may also be done in advance. As noticed above, the worst problems occur on the gamut edge. Hence one could have one linearization for the line connecting the red primary to the green primary, one linearization for the line connecting the red primary to the blue primary and one linearization for the line connecting the green primary to the blue primary. Another way may be to have linearizations that will be used close to the red primary, another close to the green primary, and a third that is used close to the blue primary. Furthermore it is possible to have several linearizations along the line of the gamut, as shown in FIG. 19.

Thus, there can be different linearizations in different areas. If the color is inside the circle with a solid line, we are close to the green primary and we can use one linearization. If we are further along towards the red primary, i.e. inside the dashed box, we can use a second linearization. If we are close to the edge of the gamut and roughly half way between the red and the green primary, i.e. inside the dotted box, a third linearization can be used. If we are even closer to the red primary, i.e. inside the box with a solid line, a fourth linearization can be used. If we are inside the dotted circle, i.e. close to the red primary, a fifth linearization can be used. The same partitioning of the other two lines in the triangle can also be used. Finally the area inside the triangle but in no box or circle can be partitioned into one or more areas, each area having a different linearization.

Another way is to create a look-up table (LUT). As can be seen from the above formulation, if we have Cb', Cr' and the wanted Y-value, it is possible to find the best Y' using any of the iterative techniques mentioned above. Hence we can create a look-up table for every possible combination of Cb', Cr' and Y. Assume for instance that Cb' and Cr' is quantized to 10 bits. Assume further that we also quantize Y to 10 bits. We then need $2^{10} \times 2^{10} \times 2^{10}$ different values in our look-up table. That is equivalent to $2^{30}$ values. If each value is two bytes, this means $2^{31}$ bytes, or 2 Gb. That is big but maybe not infeasible, especially in the future.

Care may need to be taken when quantizing Y. Since Y is completely linear, it may be inefficient to just quantize it. It may instead be better to create Ynonlinear=TF(Y) and instead create a LUT for Y using Cb', Cr' and Ynonlinear as input variables. Given Cb', Cr' and Y, we would then first calculate Ynonlinear=TF(Y) and then find Y'=LUT(Cb', Cr', Ynonlinear).

It may also be possible to use a smaller LUT. For instance, it may be possible to quantize Y (or Ynonlinear), Cb' and Cr' to, say, 6 bits. Then the table size would be $2^{(6+6+6)}=2^{18}$ values or $2^{19}$ bytes, which is equal to 512 kbytes. That is a reasonable size even with today's hardware.

It may be possible to take the quantized values Cb', Cr' and Y closest to the true values and interpolate them. As an example, if the real value of Cb' is bigger than Cb' quantized to 6 bits but smaller than Cb' quantized to 6 bits+1, the following may be good approximation:

$Y'=(LUT(Cb'6 \text{ bit}, Cr'6 \text{ bit}, Y6 \text{ bit})+(LUT(Cb'6 \text{ bit}+1, Cr'6 \text{ bit}, Y6 \text{ bit}))/2$ Interpolating between more than two values is also possible.

In an embodiment, a look-up table is used for deriving the value of Y'. In one version the look-up table contains every possible value of $Y_o$, Cb' and Cr'. For 10 bit video that will result in 1024×1024×1024 entries and in some applications this size is acceptable. In another version the look-up table (LUT) is pruned, for example through rounding one or more of $Y_o$, Cb' and Cr', e.g. to 8 bits. If a pruned look-up table is used the algorithm can be extended with a refinement step that finds the best Y' starting from the Y' that was retrieved from the LUT. In a version the LUT is only used when the Cb' value and/or the Cr' value is such that Y' can become too different from $Y_o$, i.e. when the initially calculated Y' gives a linear Y value that is too different from $Y_O$, and thereby the size of the LUT can be substantially reduced since many values of Cb' and Cr' will not cause any problems.

In an embodiment, a function of $Y_o$, Cb' and Cr', e.g. a linear combination, polynomial function, exponential function, logarithmic function, trigonometric function, etc., is used for deriving Y'. The function can be defined such that for any value of $Y_o$, Cb' and Cr' the difference between Y and $Y_o$ is below a certain threshold or the difference between the derived Y' and the optimal Y' is below a certain threshold.

In an embodiment several different functions of $Y_o$, Cb' and Cr' are defined for deriving Y'. The selection of which function to use is based on the value of $Y_o$, Cb' and Cr'.

For each embodiment described herein it could be the case that the method for deriving Y' is only invoked if the difference between Y' and $Y_o$ is above a certain threshold to begin with.

ANNEX B

This Annex B investigates color artifacts due to 4:2:0 subsampling. First, an attempt to cross-check is made, but the worst value cannot be reproduced, likely due to a bug in HDRTools that has already been fixed. Next, a search is performed for the worst relative error in luminance arising from 4:2:0 subsampling. It is found that a relative error of 86% (195 Barten steps) can occur even if displayed on a screen limited to 4000 nits. Even if data is restricted to Rec709 and held in a BT.2020 container, an error of 30 Barten steps is possible. For P3 content in a BT.2020 container, an error of 40 Barten steps is possible.

1 INTRODUCTION

It has been noted that small changes in color can introduce surprisingly large artifacts when 4:2:0 subsampling is used, even if no compression is happening.

1.1 Cross-Check Discrepancies

This investigation started as a cross-check of m35255 [1], trying to replicate the results on slide 13, reprinted in Table B1 below. The results are from a test image where the left part of the image up to pixel 95 has the color (3000, 0, 100) and the right part, pixel 96 and forward, has the color (3000, 4, 100).

TABLE B1

| values of m35255 | | | | | | |
|---|---|---|---|---|---|---|
| 4:2:0 10 bits | 94 | 95 | 96 | 97 | 98 | 99 |
| EXR | 3000 | 3000 | 3000 | 3000 | 3000 | 3000 |
| RGB | 0 | 0 | 4 | 4 | 4 | 4 |
| in | 100 | 100 | 100 | 100 | 100 | 100 |
| YCbCr | 258 | 258 | 404 | 404 | 404 | 404 |

TABLE B1-continued values of m35255

| 4:2:0 10 bits | 94 | 95 | 96 | 97 | 98 | 99 |
|---|---|---|---|---|---|---|
|  | 650 | 650 | 640 | 640 | 570 | 570 |
|  | 882 | 882 | 870 | 870 | 787 | 787 |
| implied | 258 | 258 | 401 | 404 | 404 | 404 |
| YCbCr | 650 | 649 | 642 | 604 | 570 | 566 |
|  | 882 | 881 | 862 | 828 | 787 | 782 |
| EXR | 3006 | 2958 | 10000 | 5860 | 2998 | 2764 |
| RGB | 0 | 0 | 1.57324 | 2.58008 | 3.99609 | 4.20313 |
| out | 99.1875 | 97.125 | 402.25 | 199 | 100.125 | 92.1875 |

When cross-checking using the same procedures as for the anchors (n14548, [2]) we got the result shown in Table B2. For downsampling, the filters described in Section 2.4.7 of [2] was followed (2 and 3 taps) and for upsampling Section 2.4.8 of [2] was followed (4 tap filters).

TABLE B2 values when trying to crosscheck

| 4:4:4 10 bits | 94 | 95 | 96 | 97 | 98 | 99 |
|---|---|---|---|---|---|---|
| EXR | 3000 | 3000 | 3000 | 3000 | 3000 | 3000 |
| RGB | 0 | 0 | 4 | 4 | 4 | 4 |
| in | 100 | 100 | 100 | 100 | 100 | 100 |
| YCbCr | 258 | 258 | 404 | 404 | 404 | 404 |
| 4:2:0 | 650 |  | 580 |  | 570 |  |
|  | 882 |  | 799 |  | 787 |  |
| YCbCr | 258 | 258 | 404 | 404 | 404 | 404 |
| after | 650 | 616 | 580 | 571 | 570 | 569 |
| upsampling | 882 | 841 | 799 | 788 | 787 | 786 |
| EXR | 3006 | 1551 | 3644 | 3048 | 2998 | 2950 |
| RGB | 0 | 0.0169 | 3.5293 | 3.9531 | 3.9961 | 4.0391 |
| out | 99.1875 | 48.2188 | 122.9375 | 102.2500 | 100.125 | 98.0625 |

As can be seen, this matches really poorly and only pixel nos. 94 and 98 matches, whereas no match is found for pixel nos. 95-97 or 99. However, moving the discontinuity to pixel 97 instead gives a much better match, as shown in Table B3.

TABLE B3 values when moving the discontinuity

| 4:4:4 10 bits | 94 | 95 | 96 | 97 | 98 | 99 |
|---|---|---|---|---|---|---|
| EXR | 3000 | 3000 | 3000 | 3000 | 3000 | 3000 |
| RGB | 0 | 0 | 0 | 4 | 4 | 4 |
| in | 100 | 100 | 100 | 100 | 100 | 100 |
| YCbCr | 258 | 258 | 258 | 404 | 404 | 404 |
| 4:2:0 | 650 |  | 640 |  | 570 |  |
|  | 882 |  | 870 |  | 787 |  |
| YCbCr | 258 | 258 | 258 | 404 | 404 | 404 |
| after | 650 | 649 | 640 | 604 | 570 | 566 |
| upsampling | 882 | 881 | 870 | 828 | 787 | 782 |
| EXR | 3006 | 2958 | 2476 | 5860 | 2998 | 2764 |
| RGB | 0 | 0 | 0.00142 | 2.58008 | 3.99609 | 4.20312 |
| out | 99.1875 | 97.125 | 80.5625 | 199 | 100.125 | 92.1875 |

In Table B3, only pixel no. 96 does not match. That is also the pixel with the strangest values (10000, 1.57, 402.25), the correct answer being (3000, 0, 100) or (3000, 4, 100) depending on where you put the discontinuity.

It seems as if the mismatch in the crosscheck is due to an error that has already been corrected in HDRtools. If reverting to revision 492, we can produce the same values as in m35255 [1]. To confirm that the newer version of HDRtools (revision 573) is correct we have independently implemented the processing chain in Matlab and we get the same results as in Table B3. The reason why we had to move the discontinuity to get a match is probably due to the faulty filtering in revision 492 which has been fixed in the current version.

1.2 Rounding Issue

When implementing the Matlab crosscheck, we realized that the conversion of float to EXR in HDRtools lacks rounding. Instead of rounding the 23 bits of the mantissa to 10 bits, they are just right-shifted, basically replacing a round( ) with a floor( ). This affects the end result. As an example a float of 3007.9 will be converted to 3006.0, even though 3008.0 is a much closer value. To get a match we made the Matlab code emulate the floor( )-type conversion in the current revision of HDRtools (revision 587 of [3]).

1.3 Color Outliers

Note that even if pixel 96 is no longer an extreme outlier, pixel 97 is still quite far from correct: (5860, 2.58, 199)

instead of (3000, 4, 100). That raises the question; how bad outliers can 4:2:0 subsampling generate and where does this happen? To answer this question we first have to define what we mean by "bad". We concentrated on the luminance, since the human visual system is more sensitive to changes in luminance than in chrominance. Hence we transformed both the input EXR image and the output EXR image both linear light to XYZ, and formed the difference in Y. To get a relative error we then divided by the Y component of the original. We then wrote a small program maximizing this relative error for pixel 97 over all possible images of the type where the left part is of one color and the right part is the same color plus a small delta of length 4, just as was done in m35255 [1].

Running this program gave the answer that having the color (2142, 0, 138) in the left part and (2142, 4, 138) in the right part gives the largest visible error, as shown in Table B4. The optimization software that looks for the "worst" error is not guaranteed to find the global maximum, hence even worse positions in the color gamut may exist.

TABLE B4 data for the "worst" color for 4:2:0 subsampling

| pixel 97 | RGB value | Y value | Y diff | relative error | Barten steps |
|---|---|---|---|---|---|
| original | 2142<br>4<br>138 | 573.5991 | 0 | 0 | 0 |
| RGB 4:4:4 | 2142.6617<br>3.9750<br>138.2966 | 573.7735 | 0.1745 | 0.0304% | 0.0691 |
| RGB 4:2:0 | 3993.7333<br>2.4265<br>263.6030 | 1066.4311 | 492.8320 | 85.9192% | 195.2710 |

It should be noted that having a red component higher than 2142 would generate an even higher relative error. However, we assumed that RGB values above 4000 would be clipped to 4000 by the monitor, so we believe that the actual on-screen difference would start to diminish if higher values were used.

Figure 20:
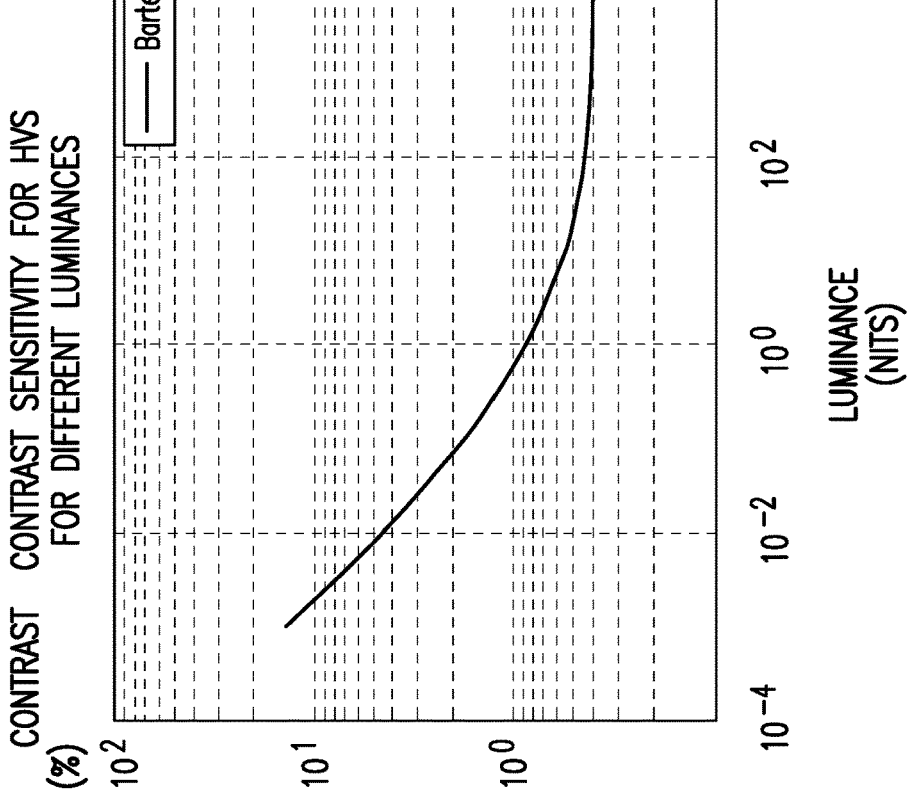
FIG. 20 illustrates Barten's curve for contrast sensitivity.

As can be seen in Table B4, the relative error for RGB 4:4:4 is 0.0304%. To put that in perspective, we compared that with Barten's curve, see FIG. 20 illustrating Barten's curve for contrast sensitivity. A contrast below the curve is not noticeable. Table B5 shows the values used for plotting the curve in FIG. 20.

TABLE B5 values used for plotting the Barten's curve

| Luminance in cd/m$^2$ | Contrast (%) |
|---|---|
| $10^{-3}$ | 13.8294 |
| $10^{-2}$ | 4.5454 |
| $10^{-1}$ | 1.7461 |
| $10^0$ | 0.8507 |
| $10^1$ | 0.5454 |
| $10^2$ | 0.4360 |
| $10^3$ | 0.4027 |
| $10^4$ | 0.3962 |

As can be seen in FIG. 20, the tolerance for relative errors decreases with increased luminance. At 100 nits, an error of 0.44% can be just noticeable, whereas at 1000 nits, an error of 0.40% can be just noticeable. Since 455 nits is right between these, we use the higher value of 0.44%. This gives a Barten step of 0.069, which means it is not noticeable.

For 4:2:0 subsampling, on the other hand, the relative error is 85.92%. This is equivalent to over 195 Barten steps, which should be clearly visible. It therefore seems reasonable to conclude that 4:2:0 subsampling can create clearly visible artifacts, at least together with non-constant luminance and a highly non-linear transfer function as is the case in the anchor generation.

Note that the worst error is right on the border of the color gamut; since the green color is zero, the color (2142, 0, 138) is on the line between the red and green color primaries. This is consistent with what was reported in m35255 [1], which also pointed out colors on the gamut edge as problematic.

1.4 when Input is 709 Data

Figure 21:
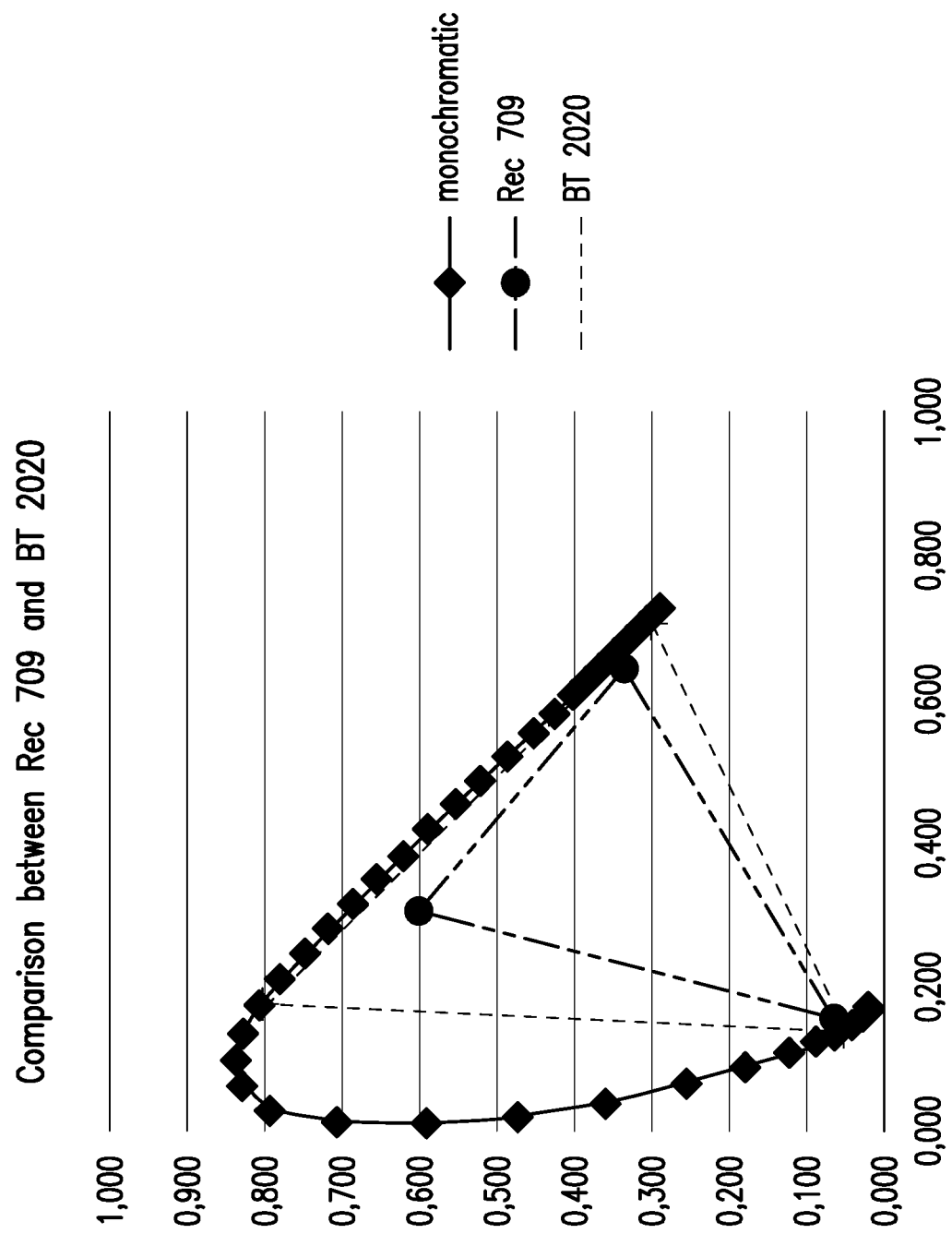
FIG. 21 illustrates a comparison between Rec709 and BT.2020 color gamuts.

The data presented in Table B1 was for BT.2020 primaries. If the input data is with Rec709 primaries, but the container is BT.2020, it will not be possible to reach the color gamut boundary. This is due to the fact that the Rec709 gamut triangle is inside the BT.2020 triangle, not touching the gamut boundary, as can be seen in FIG. 21. It is therefore reasonable to assume that the relative error will be smaller.

We have run the optimization software to find the Rec709 color that, after conversion to BT.2020, would result in the largest relative error. The resulting two colors are (0, 0, 50) for the left part of the screen and (2, 3, 49) in the right part. This is presented in Table B6.

TABLE B6 data for the "worst" color for 4:2:0 subsampling
if input is Rec709 and container format is BT.2020

| pixel 97 | RGB value | Y value | Y diff | relative error | Barten steps |
|---|---|---|---|---|---|
| original<br>Rec709 color | 2<br>3<br>49 | | | | |
| original<br>BT.2020 color | 4.3650<br>3.4535<br>44.1810 | 6.1082 | | | |
| RGB 4:4:4 | 4.3793<br>3.4293<br>43.7035 | 6.0672 | 0.0410 | 0.6711% | 1.2305 |
| RGB 4:2:0 | 4.4055<br>2.9939<br>63.5135 | 7.2163 | 1.1082 | 18.1422% | 33.2640 |

Here we have used the Barten curve at 10 nits, which equals 0.54%. For RGB 4:4:4 we then get an error that is just noticeable at 1.2305 Barten steps, whereas the error in RGB 4:2:0 equals 33 Barten steps, which should be clearly visible. It is also reasonable that the error is smaller (33 Barten steps vs. 195 Barten steps) since starting out with Rec709 data precludes the color from reaching all parts of the gamut edge of BT.2020.

Notice also how the optimization result has found that the worst error is available near the blue primary. This is likely because the blue Rec709 primary is closest to the BT.2020 gamut edge, as can be seen in FIG. 21.

1.5 When Input is P3 Data

The same test can be carried out for P3 source data contained in a BT.2020 container. The worst colors are then (2.48, 3.32, 4.63) and (3.29, 0, 6.71), as shown in Table B7.

TABLE B7 data for the "worst" color for 4:2:0 subsampling
if input is P3 and container format is BT.2020

| pixel 97 | RGB value | Y value | Y diff | relative error | Barten steps |
|---|---|---|---|---|---|
| original P3 color | 3.29<br>0<br>6.71 | | | | |
| original BT.2020 color | 2.7993<br>0.2342<br>6.5960 | 1.2853 | | | |
| RGB 4:4:4 | 2.8099<br>0.2304<br>6.4838 | 1.2788 | 0.0065 | 0.5062% | 0.5951 |
| RGB 4:2:0 | 1.4911<br>0.3834<br>3.2402 | 0.8438 | 0.4416 | 34.3530% | 40.38 |

We would assume that the error would be somewhere between that of Rec709 and BT.2020, and this is also the case, we now get an error equivalent of 40.38 Barten steps. Note that since the Barten value changes, it is important to include it in the loop when searching for the worst value. We have used the Barten value for 1 $cd/m^2$, which equals 0.85%.

1.6 Conclusion

This Annex has investigated the error in luminance due to 4:2:0 subsampling. Although we have not been able to match the worst outlier from m35255 [1], the worst case errors are still significant, reaching almost 200 Barten steps for general data. Even if the source data is constrained to Rec709 and put into a BT.2020 container, the error is still significant, over 30 Barten steps, and for P3 data in a BT.2020 container, over 40 Barten steps.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] International Organization for Standardization, ISO/IEC JTC1/SC29/WG11, Coding of moving pictures and audio, MPEG2013/M35255, October 2014, Strasbourg, France, Francois et al., About using a BT.2020 container for BT.709 content
[2] International Organization for Standardization, ISO/IEC JTC1/SC29/WG11, Coding of moving pictures and audio, MPEG2014/N14548, July 2014, Sapporo, Japan, Luthra et al., Test sequences and anchor generation for HDR and Wide Gamut Content Distribution
[3] https://wg11.sc29.org/svn/repos/Explorations/XYZ/HDRTools/branches/0.9-dev
[4] ITU-T, TELECOMMUNICATION STANDARDIZATION SECTOR OF ITU, SERIES H: AUDIOVISUAL AND MULTIMEDIA SYSTEMS, Infrastructure of audiovisual services—Coding of moving video, High efficiency video coding, 04/2015
[5] International Organization for Standardization, ISO/IEC JTC1/SC29/WG11, Coding of moving pictures and audio, MPEG2014/N15083, February 2015, Geneva, Switzerland, Luthra et al., Call for Evidence (CfE) for HDR and WCG Video Coding

The invention claimed is:

1. A method of encoding a pixel of an input video sequence, the method comprising:
    encoding a second color component value and a third color component value of the pixel in a first color space;
    obtaining a first color component value in a second color space for the pixel, wherein the second color space is different from the first color space;
    determining a first color component value of the pixel in the first color space based on reducing an error computed based on a difference between the first color component value in the second color space and a test color component value in the second color space, wherein the test color component value is derived based on the encoded second color component value and the encoded third component value; and
    encoding the first color component value of the pixel in the first color space.

2. The method of claim 1, wherein encoding the second color component value and the third color component value comprises, for each color component value of the second color component value and the third color component value:
    determining an intra or inter prediction of the color component value;
    transforming a prediction error calculated as a difference between the color component value and the intra or inter prediction to form transform coefficients; and
    quantizing the transform coefficients.

3. The method of claim 1, wherein obtaining the first color component value in the second color space comprises:
    upsampling the second color component value and the third color component value in the first color space to obtain an upsampled second color component value and an upsampled third color component value in the first color space; and
    converting an original first color component value of the pixel in the first color space, and the upsampled second color component value and the upsampled third color component value in the first color space into the first color component value in the second color space.

4. The method of claim 1, further comprising:
    decoding the encoded second color component value and the encoded third color component value to obtain a reconstructed second color component value and a reconstructed third color component value in the first color space;
    upsampling the reconstructed second color component value and the reconstructed third color component value to obtain an upsampled reconstructed second color component value and an upsampled reconstructed third color component value in the first color space; and
    deriving the test color component value in the second color space based on a test color component value in the first color space, the upsampled reconstructed second color component value and the upsampled reconstructed third color component value in the first color space.

5. The method of claim 1, wherein determining the first color component value in the first color space comprising selecting the test color component value in the first color space that reduces the error computed based on the difference between the first color component value in the second color space and the test color component value in the second color space derived based on a test color component value in the first color space, the encoded second color component value and the third encoded component value.

6. The method of claim 1, wherein encoding the first color component value comprises:
   determining an intra or inter prediction of the first color component value in the first color space;
   transforming a prediction error calculated as a difference between the first color component value in the first color space and the intra or inter prediction to form transform coefficients; and
   quantizing the transform coefficients.

7. The method of claim 1, further comprising performing obtaining the first color component value and determining the first color component value if the pixel is a pixel of a random access point, RAP, picture of the input video sequence.

8. The method of claim 1, further comprising performing obtaining the first color component value and determining the first color component value if the pixel is a pixel of a picture in a lowest layer in the input video sequence having pictures organized in a hierarchical group of pictures, GOP, structure.

9. The method of claim 1, further comprising:
   decoding the encoded first color component value to obtain a reconstructed first color component value in the first color space; and
   determining a sample adaptive offset that reduces 1) a squared error or absolute error between the first color component value in the first color space and a sum of the reconstructed first color component value in the first color space and the sample adaptive offset or 2) a rate-distortion cost calculated as a function of a distortion representing a difference between the first color component value in the first color space and the sum of the reconstructed first color component value in the first color space and the sample adaptive offset and an amount of bits spent for encoding the sample adaptive offset.

10. The method of claim 1, wherein
    encoding the second color component value and the third color component value comprising encoding chroma component values Cb'Cr' in a Y'Cb'Cr' color space;
    obtaining the first color component value comprises obtaining a luminance value Y for the pixel in a XYZ color space;
    determining the first color component value comprises determining a luma component value Y' of the pixel in the Y'Cb'Cr' color space based on reducing an error computed based on a difference between the luminance value Y in the XYZ color space and a test luminance value in the XYZ color space derived based on the encoded chroma component values Cb'Cr'; and
    encoding the first color component value comprises encoding the luma component value Y' in the Y'Cb'Cr' color space.

11. The method of claim 1, wherein
    encoding the second color component value and the third color component value comprising encoding chroma component values Cb'Cr' in a Y'Cb'Cr' color space;
    obtaining the first color component value comprises obtaining a non-linear luminance value pq(Y) of for pixel in a pq(Y)xy color space;
    determining the first color component value comprises determining a luma component value Y' of the pixel in the Y'Cb'Cr' color space based on reducing an error computed based on a difference between the non-linear luminance value pq(Y) in the pq(Y)xy color space and a test luminance value in the pq(Y)xy color space derived based on the encoded chroma component values Cb'Cr'; and
    encoding the first color component value comprises encoding the luma component value Y' in the Y'Cb'Cr' color space.

12. A device for encoding a pixel of an input video sequence, the device comprising:
    a processor; and
    a memory comprising instructions executable by the processor, wherein the processor is configured to:
      encode a second color component value and a third color component value of the pixel in a first color space;
      obtain a first color component value in a second color space for the pixel, wherein the second color space is different from the first color space;
      determine a first color component value of the pixel in the first color space based on reducing an error computed based on a difference between the first color component value in the second color space and a test color component value in the second color space, wherein the test color component value is derived based on the encoded second color component value and the encoded third component value; and
      encode the first color component value of the pixel in the first color space.

13. The device of claim 12, wherein the device is further configured to:
    determine, for each color component value of the second color component value and the third color component value, an intra or inter prediction of the color component value;
    transform, for each color component value of the second color component value and the third color component value, a prediction error calculated as a difference between the color component value and the intra or inter prediction to form transform coefficients; and
    quantize, for each color component value of the second color component value and the third color component value, the transform coefficients.

14. The device of claim 12, wherein the device is further configured to:
    upsample the second color component value and the third color component value in the first color space to obtain an upsampled second color component value and an upsampled third color component value in the first color space; and
    convert an original first color component
      value of the pixel in the first color space, and the upsampled second color component value and the upsampled third color component value in the first color space into the first color component value in the second color space.

15. The device of claim 12, wherein the device is further configured to:
    decode the encoded second color component value and the encoded third color component value to obtain a reconstructed second color component value and a reconstructed third color component value in the first color space;
    upsample the reconstructed second color component value and the reconstructed third color component value to obtain an upsampled reconstructed second color component value and an upsampled reconstructed third color component value in the first color space; and derive the test color component value in the second color space based on a test color component value in the first color space, the upsampled reconstructed second color component value and the upsampled reconstructed third color component value in the first color space.

16. The device of claim 12, wherein the device is further configured to select the test color component value in the first color space that reduces the error computed based on the difference between the first color component value in the second color space and the test color component value in the second color space derived based on a test color component value in the first color space, the encoded second color component value and the third encoded component value.

17. The device of claim 12, wherein the device is further configured to:
determine an intra or inter prediction of the first color component value in the first color space;
transform a prediction error calculated as a difference between the first color component value in the first color space and the intra or inter prediction to form transform coefficients; and
quantize the transform coefficients.

18. The device of claim 12, wherein the device is further configured to perform obtaining the first color component value and determining the first color component value if the pixel is a pixel of a random access point, RAP, picture of the input video sequence.

19. The device of claim 12, wherein the device is further configured to perform obtaining the first color component value and determining the first color component value if the pixel is a pixel of a picture in a lowest layer in the input video sequence having pictures organized in a hierarchical group of pictures, GOP, structure.

20. The device of claim 12, wherein the device is further configured to:
decode the encoded first color component value to obtain a reconstructed first color component value in the first color space; and
determine a sample adaptive offset that reduces 1) a squared error or absolute error between the first color component value in the first color space and a sum of the reconstructed first color component value in the first color space and the sample adaptive offset or 2) a rate-distortion cost calculated as a function of a distortion representing a difference between the first color component value in the first color space and the sum of the reconstructed first color component value in the first color space and the sample adaptive offset and an amount of bits spent for encoding the sample adaptive offset.

21. The method of claim 1, wherein
the test color component value corresponds to each of a plurality of test color component values,
the step of reducing an error comprises:
computing an error based on a difference between the first color component value in the second color space and each of the plurality of test color component values,
finding, among the computed errors, an error that is the minimum among the computed errors, and
identifying the first color component value of the pixel in the first color space based on the minimum error.

22. A method for encoding a pixel of an input video sequence, the method comprising:
encoding a second color component value and a third color component value of the pixel in a first color space;
obtaining a first color component value in a second space for the pixel, wherein the second color space is different from the first color space;
selecting a test color component value in the first color space from a plurality of test color component values in the first color space;
deriving a test color component value in the second color space based on (i) the selected test color component value in the first color space, (ii) the encoded second color component value in the first color space, and (iii) the encoded third color component value in the first color space;
computing an error based on a difference between the obtained first color component value in the second space and the derived test color component value in the second space;
based on the computed error, finding an optimal test color component value in the first color space; and
encoding the optimal test color component value.

* * * * *